US012748277B2

(12) United States Patent
Beymer

(10) Patent No.: US 12,748,277 B2
(45) Date of Patent: Sep. 29, 2026

(54) BUTT CLOSURES AND ORGANIZER ASSEMBLIES THEREFOR

(71) Applicants: AFL Telecommunications LLC, Duncan, SC (US); Matthew Beymer, Sumter, SC (US)

(72) Inventor: Matthew Beymer, Sumter, SC (US)

(73) Assignee: AFL Telecommunications LLC, Duncan, SC (US)

( * ) Notice: Subject to any disclaimer, the term of this patent is extended or adjusted under 35 U.S.C. 154(b) by 279 days.

(21) Appl. No.: 18/711,239

(22) PCT Filed: Nov. 17, 2022

(86) PCT No.: PCT/US2022/050225
§ 371 (c)(1),
(2) Date: May 17, 2024

(87) PCT Pub. No.: WO2023/091558
PCT Pub. Date: May 25, 2023

(65) Prior Publication Data

US 2025/0028134 A1 Jan. 23, 2025

Related U.S. Application Data

(60) Provisional application No. 63/281,583, filed on Nov. 19, 2021.

(51) Int. Cl.
*G02B 6/44* (2006.01)

(52) U.S. Cl.
CPC ......... *G02B 6/4455* (2013.01); *G02B 6/4442* (2013.01)

(58) Field of Classification Search
CPC ............................ G02B 6/4455; G02B 6/4442
(Continued)

(56) References Cited

U.S. PATENT DOCUMENTS 5,647,763 A 7/1997 Arnold et al.
5,724,467 A 3/1998 vandenEnden et al.
(Continued)

FOREIGN PATENT DOCUMENTS

EP 3361846 A1 8/2018
EP 3732518 A1 11/2020
(Continued)

OTHER PUBLICATIONS

PCT International Search Report and Opinion PCT/US2022/050225 Apr. 13, 2023.

*Primary Examiner* — Jerry M Blevins
(74) *Attorney, Agent, or Firm* — Dority & Manning, P.A.

(57) ABSTRACT

A fiber optic closure is provided, including a base insertable at least partially into the interior of the closure. A bracket assembly includes a plurality of hinge assemblies along a transverse axis. A connector shaft connects an organizer assembly and the base together. The organizer assembly includes a main body extending between a front and a rear, a first sidewall, and a second sidewall. The main body includes a base panel extending between the first sidewall and the second sidewall and from the front to the rear. An upper retention tab extends from one or more of the first sidewall, the second sidewall, or a front wall of the main body. A lower retention tab extends from one or more walls and is positioned proximate along a transverse axis to the base panel relative to the upper retention tab.

18 Claims, 38 Drawing Sheets

(58) Field of Classification Search
USPC .............................................................. 385/15
See application file for complete search history.

(56) References Cited

U.S. PATENT DOCUMENTS

| | | | | |
|---|---|---|---|---|
| 5,790,740 | A * | 8/1998 | Cloud .................. | G02B 6/4454 385/136 |
| D402,261 | S | 12/1998 | Carlson, Jr. et al. | |
| 6,715,619 | B2 | 4/2004 | Kim et al. | |
| 6,971,909 | B2 | 12/2005 | Levesque et al. | |
| 7,031,588 | B2 | 4/2006 | Cowley et al. | |
| 7,094,095 | B1 | 8/2006 | Caveney | |
| 7,220,145 | B2 | 5/2007 | Denovich et al. | |
| D554,598 | S | 11/2007 | Laursen et al. | |
| 7,343,078 | B2 | 3/2008 | Spisany et al. | |
| 7,345,241 | B2 | 3/2008 | Caveney et al. | |
| 7,352,947 | B2 | 4/2008 | Phung et al. | |
| 7,406,240 | B2 | 7/2008 | Murano | |
| 7,591,676 | B2 | 9/2009 | Martich et al. | |
| 7,637,773 | B2 | 12/2009 | Shifris et al. | |
| 7,660,507 | B2 | 2/2010 | Morris | |
| D624,504 | S | 9/2010 | DeCraene et al. | |
| 7,875,799 | B2 | 1/2011 | Fransen et al. | |
| 8,286,325 | B2 | 10/2012 | Cooke et al. | |
| 8,315,497 | B2 | 11/2012 | Smrha et al. | |
| 8,428,418 | B2 | 4/2013 | Smrha | |
| 8,554,043 | B2 | 10/2013 | Deel et al. | |
| 8,687,933 | B2 | 4/2014 | Srutkowski et al. | |
| 8,886,005 | B2 | 11/2014 | Subhash et al. | |
| 8,913,866 | B2 | 12/2014 | Cote et al. | |
| 9,038,832 | B2 | 5/2015 | Hernandez-Ariguznaga | |
| 9,075,216 | B2 | 7/2015 | Cote et al. | |
| 9,261,654 | B2 | 2/2016 | Murphy et al. | |
| 9,557,508 | B2 | 1/2017 | Buff et al. | |
| 9,606,317 | B2 | 3/2017 | Grandidge et al. | |
| 10,295,755 | B1 | 5/2019 | Zhou et al. | |
| 10,314,394 | B2 | 6/2019 | Chen et al. | |
| 10,641,967 | B1 | 5/2020 | Cote et al. | |
| 2009/0163043 | A1 | 6/2009 | Demers et al. | |
| 2010/0220967 | A1 | 9/2010 | Cooke et al. | |
| 2011/0186532 | A1 | 8/2011 | Wu | |
| 2012/0014656 | A1 | 1/2012 | Adomeit et al. | |
| 2014/0241690 | A1 | 8/2014 | Lin et al. | |
| 2020/0218023 | A1 | 7/2020 | Chen et al. | |
| 2020/0395719 | A1 | 12/2020 | Moldoch et al. | |
| 2021/0018708 | A1 | 1/2021 | Kisselstein et al. | |
| 2021/0018710 | A1 * | 1/2021 | Allen ................... | G02B 6/4453 |
| 2021/0055495 | A1 | 2/2021 | Brewster et al. | |
| 2021/0112316 | A1 | 4/2021 | Liu et al. | |
| 2021/0112678 | A1 | 4/2021 | Liu et al. | |
| 2021/0116662 | A1 | 4/2021 | Patell et al. | |
| 2021/0160592 | A1 | 5/2021 | Liu et al. | |
| 2021/0184390 | A1 | 6/2021 | Wang | |
| 2021/0223494 | A1 * | 7/2021 | Wittmeier ............ | G02B 6/4442 |

FOREIGN PATENT DOCUMENTS

| | | | |
|---|---|---|---|
| WO | WO 95/30165 | A1 | 11/1995 |
| WO | WO2013/103206 | A1 | 7/2013 |
| WO | WO2020/085395 | A1 | 4/2020 |

* cited by examiner

BUTT CLOSURES AND ORGANIZER ASSEMBLIES THEREFOR

PRIORITY STATEMENT

The present application claims the benefit of priority to U.S. provisional patent application 63/281,583, filed Nov. 19, 2021, and to international application number PCT/US2022/050225, filed on Nov. 17, 2022, the disclosures of which are incorporated by reference herein in their entireties.

FIELD

The present disclosure relates generally to closures, such as for fiber optic cable connections, and more specifically to improved organizer assemblies for butt closures.

BACKGROUND

Certain closures, also referred to as "butt" or "domed" closures, are utilized in outdoor environments to facilitate the connection of transmission cables such as fiber optic cables. The cables enter the closure through a sealed base, and connection of the cable elements occurs within the closure. In the case of fiber optic cables, spliced-together optical fibers are held within the closure.

Many fiber organizer assemblies utilized in known butt closures generally have edges that can cause buffer tubes to kink if they are pulled over these edges. Further, in many cases, trays of the organizer assemblies must be held in the vertical or up position while other trays are being populated with fiber and while splicing is being done. Still further, splice modules utilized in such trays provide limited flexibility with respect to the types of splices and/or other components that can be held therein.

Accordingly, improved organizer assemblies for use with butt closures would be advantageous. Specifically, organizer assemblies which address one of more of the above-stated deficiencies would be advantageous.

BRIEF DESCRIPTION

Aspects and advantages of the invention will be set forth in part in the following description, or may be obvious from the description, or may be learned through practice of the invention.

In accordance with one embodiment, a fiber optic closure is provided. A base is insertable at least partially into the interior of the closure. A basket extends along a longitudinal axis between a first end and a second end. The first end forms an open end such that one or more cables extends into the interior of the closure along the longitudinal axis. The second end forms a closed end. A connector shaft extends from the first end along the longitudinal axis. The connector shaft connects the deep tray and the base together. A bracket assembly extends along a transverse axis from the basket. The bracket assembly includes a plurality of hinge assemblies along the transverse axis. A deep tray is rotatably and removably connectable to the bracket assembly between the hinge assemblies. The deep tray extends along the longitudinal axis between the first end and the second end and extending along a lateral axis between a first sidewall and a second sidewall. A plurality of retention tabs includes an upper retention tab extending along the lateral axis from one or more of the first sidewall or the second sidewall. A lower retention tab extends from the first sidewall or the second sidewall proximate along the transverse axis to the base panel relative to the upper retention tab.

In accordance with another embodiment, a fiber optic organizing system is provided. The system includes a main body extending between a front and a rear, a first sidewall, and a second sidewall. The main body includes a base panel extending between the first sidewall and the second sidewall and from the front to the rear. An upper retention tab extends from one or more of the first sidewall, the second sidewall, or a front wall of the main body. A lower retention tab extends from one or more walls and is positioned proximate along a transverse axis to the base panel relative to the upper retention tab.

In accordance with yet another embodiment, a fiber optic closure is provided. The closure includes a base insertable at least partially into the interior of the closure. A basket is extending along a longitudinal axis between a first end and a second end. The first end forms an open end such that one or more cables extends into the interior of the closure along the longitudinal axis. The second end forms a closed end. A connector shaft is extending from the first end along the longitudinal axis. The connector shaft is connecting the organizer assembly and the base together. A bracket assembly is extending along a transverse axis from the basket. The bracket assembly includes a plurality of hinge assemblies along the transverse axis. An organizing system is rotatably and removably connectable to the bracket assembly between the hinge assemblies. The organizing system includes a main body, the main body including a plurality of walls separated along the longitudinal axis between a front and a rear and along the lateral axis. The main body includes a base panel connecting the plurality of walls. An adapter module includes an adapter wall extending along the transverse axis, wherein a slot is extending along the transverse axis from an upper peripheral edge of the adapter wall. An adapter insert is extending along a base panel and disposable within slots at adapter walls.

In accordance with still another embodiment, a fiber optic closure is provided. The closure includes a base insertable at least partially into the interior of the closure. A basket is extending along a longitudinal axis between a first end and a second end. The first end forms an open end such that one or more cables extends into the interior of the closure along the longitudinal axis. The second end forms a closed end. A connector shaft is extending from the first end along the longitudinal axis. The connector shaft is connecting the organizer assembly and the base together. A bracket assembly is extending along a transverse axis from the basket. The bracket assembly includes a plurality of hinge assemblies along the transverse axis. An organizing system is rotatably and removably connectable to the bracket assembly between the hinge assemblies. The organizing system includes a main body, the main body including a plurality of walls separated along the longitudinal axis between a front and a rear and along the lateral axis. The main body includes a base panel connecting the plurality of walls. A splice module forming one or more module walls is extending along the transverse axis and the lateral axis. The plurality of mount openings is configured to receive the splice module and affix to the base panel.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF FIGURES

A full and enabling disclosure of the present invention, including the best mode thereof, directed to one of ordinary skill in the art, is set forth in the specification, which makes reference to the appended figures, in which.

DETAILED DESCRIPTION

Figure 1:
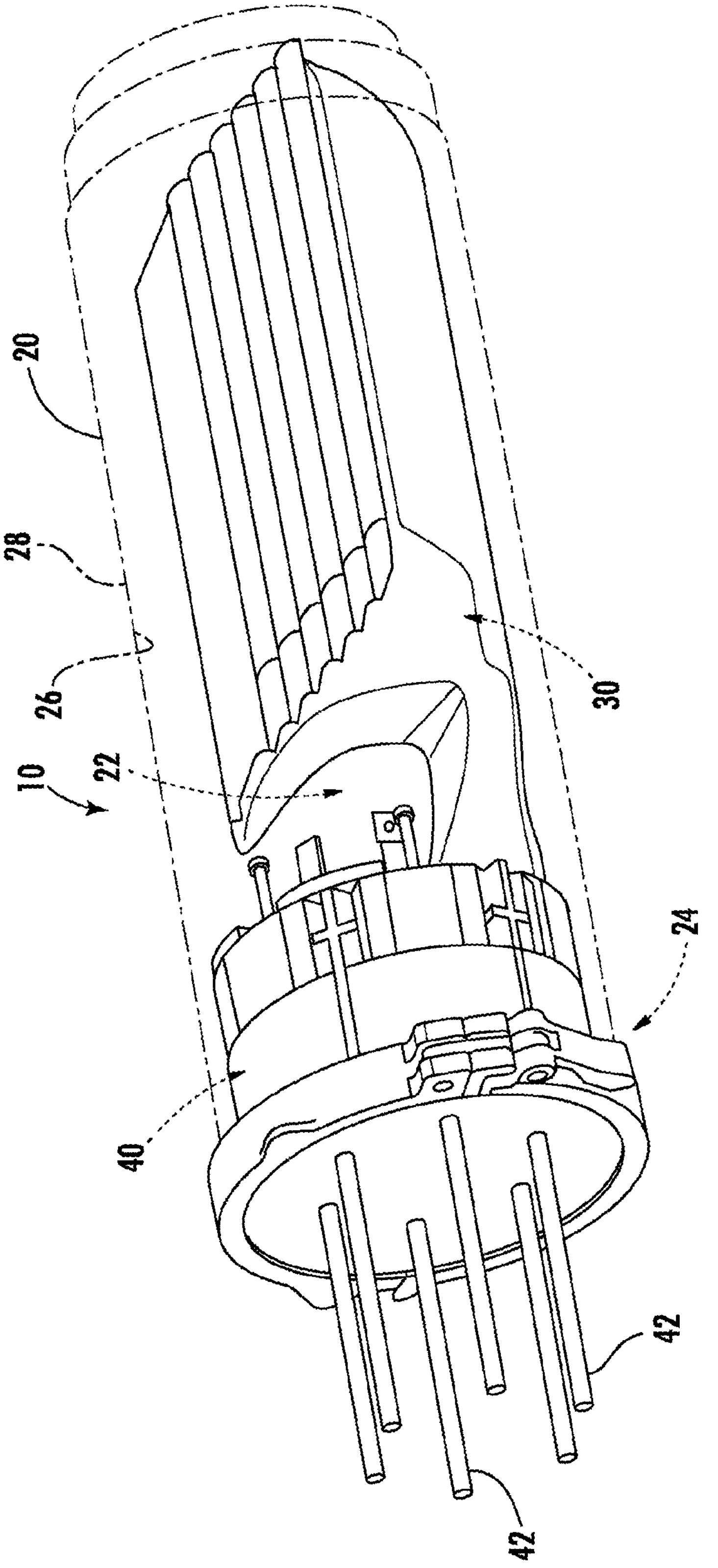
FIG. 1 is a perspective view of a butt closure in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, embodiments of butt closures 10 and organizer assemblies in accordance with the present disclosure are provided. Closures 10 in accordance with the present disclosure, and in particular the organizer assemblies and deep tray organizer assemblies, thereof, may advantageously provide improved routing features which reduce kinking and attenuation risks. Additionally or alternatively, closures 10, organizer baskets 110, 150, and trays 200, 300 thereof in accordance with the present disclosure may advantageously provide improved features for securing and positioning organizer trays thereof in a variety of positions, thus advantageously allowing efficient and effective fiber-populating, splicing, etc. Additionally, or alternatively, closures 10 and organizer baskets thereof in accordance with the present disclosure, and in particular the splice modules and adapter modules which may be utilized with such closures 10 and/or organizer baskets and trays, may advantageously provide improved flexibility with respect to the types of splices and/or other components that can be held therein.

Referring now to FIG. 1, a closure 10 in accordance with the present disclosure includes a cover 20. Cover 20 is generally a domed cover which defines an interior 22 and an opening 24 which provides access to the interior 22. Cover 20 may include an inner surface 26 which defines the interior 22 and an opposing outer surface 28 which is exposed to the external environment.

An organizer assembly 30 may be insertable into (and thus disposed within) the interior 22, such as along a longitudinal axis of the closure 10. Organizer assembly 30 may include one or more organizer trays 200 and/or other suitable components for facilitating transmission component connections. For example, in the case of use with fiber optic cables, splices between optical fibers thereof may be housed in the various splice trays.

A base 40 may be insertable at least partially into (and thus disposed at least partially within) the interior 22. In some embodiments, organizer assembly 30 may be connected to the base 40, such that insertion of the base 40 causes insertion of the tray assembly 30 into the interior 22. Cables 42 may be inserted through the base 40 into the interior 22, and connection between transmission elements thereof (such as optical fibers) may be made within the interior 22, such as in the organizer trays 200 of the organizer assembly 30.

FIGS. 2 through 14 illustrate various embodiments of organizer assemblies 30 and components thereof in accordance with embodiments of the present disclosure. A mutually orthogonal coordinate system may be defined for organizer assemblies 30 in accordance with the present disclosure, and may include a mutually orthogonal longitudinal axis 102, lateral axis 104, and transverse axis 106.

Figure 2:
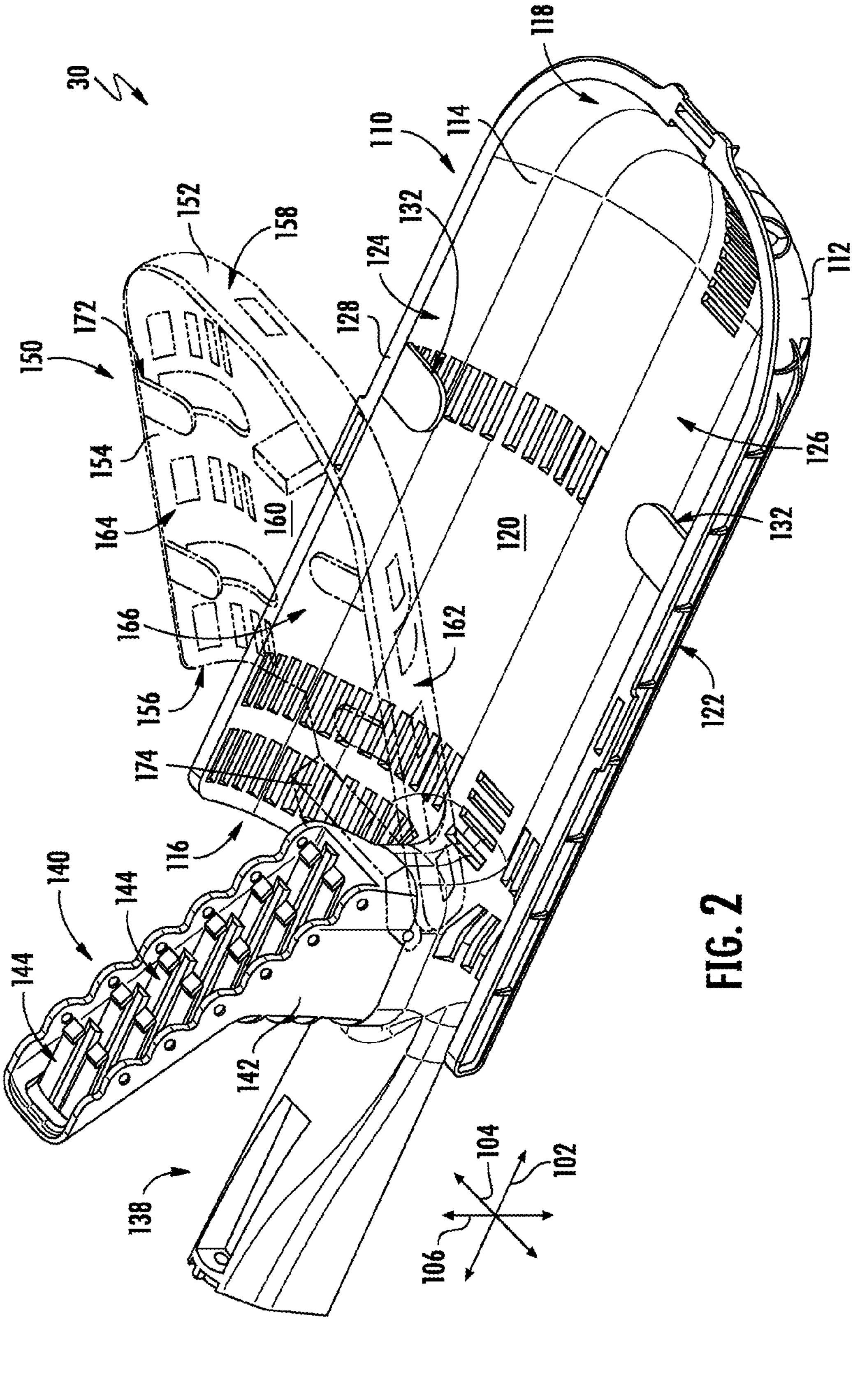
FIG. 2 is a perspective view of an organizer assembly, with a secondary basket connected thereon, in accordance with embodiments of the present disclosure.
Figure 3:
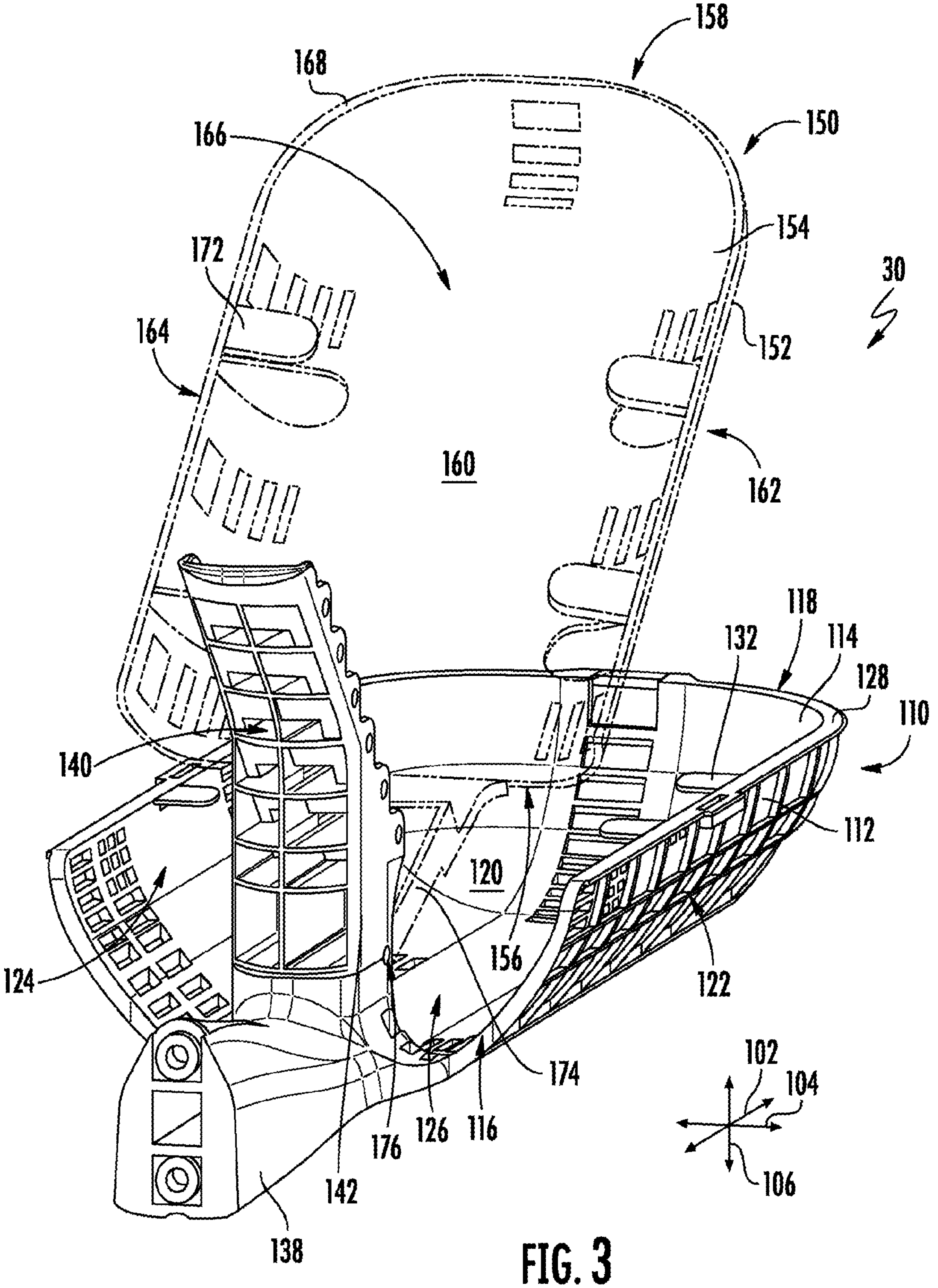
FIG. 3 is a rear perspective view of an organizer assembly, with a secondary basket connected thereon, in accordance with embodiments of the present disclosure.
Figure 4:
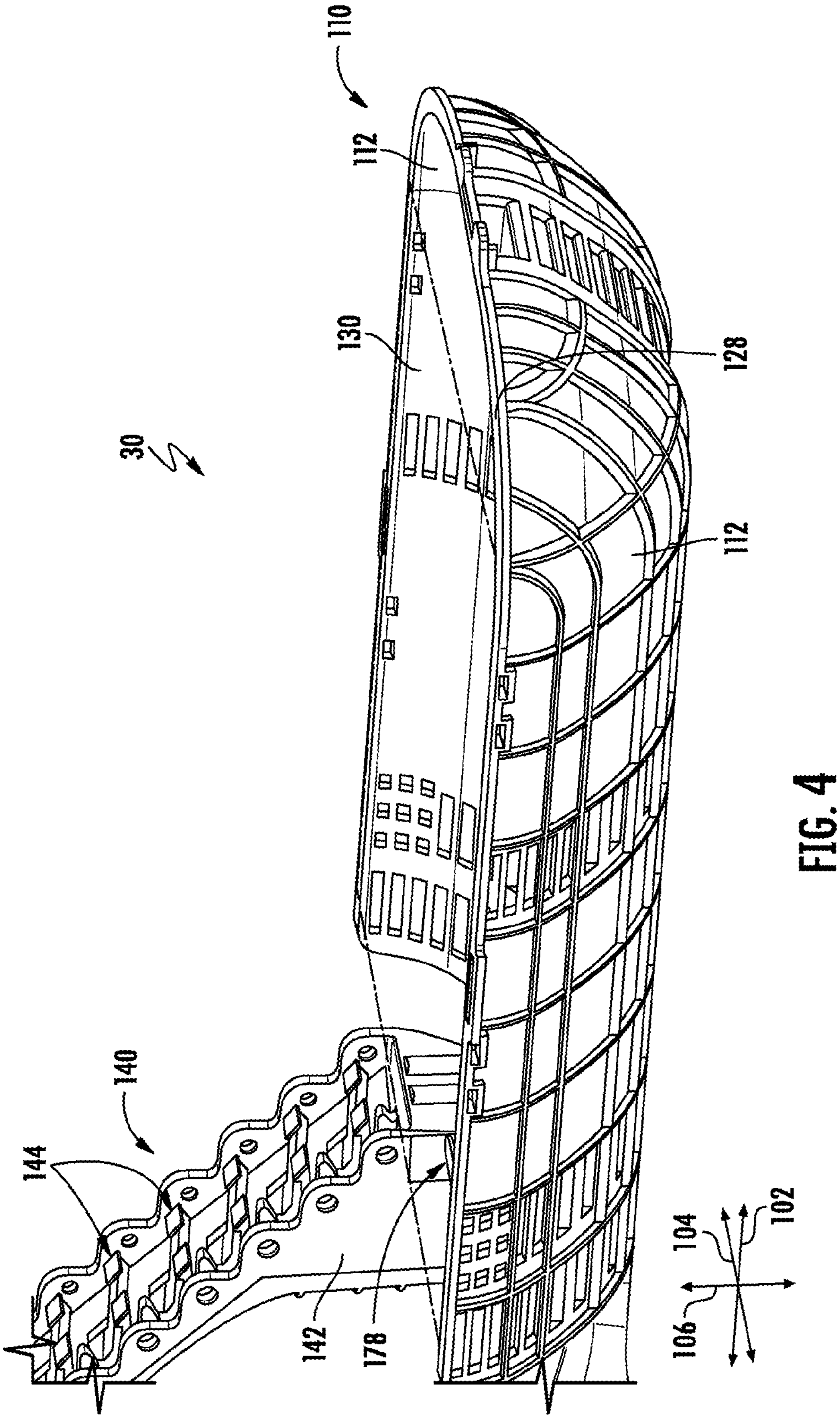
FIG. 4 is a perspective view of an organizer assembly, with a cover plate provided thereon, in accordance with embodiments of the present disclosure.

Referring in particular to FIGS. 2 through 4, organizer assemblies 30 in accordance with the present disclosure may include a primary basket 110. The primary basket 110 generally forms at least a portion of the base exterior of the organizer assembly 30, and includes an exterior surface 112 and an interior surface 114. The primary basket 110 may extend along the longitudinal axis 102 between a first end 116 and a second end 118. The first end 116 may be an open end, as shown, such that cables 42 or transmission elements thereof being directed along and parallel to the longitudinal axis 102 can enter or exit an interior 120 of the primary basket 110 through the first end 116. The second end 118 may be a closed end, as shown, such that cables 42 or transmission elements thereof being directed along and parallel to the longitudinal axis 102 cannot enter an interior 120 of the primary basket 110 through the second end 118, and instead encounter a surface of the primary basket 110.

The primary basket 110 may further extend along the lateral axis 104 between a first side 122 and a second side 124, both of which may be closed (as discussed above with respect to second end 118). In exemplary embodiments, a length between the first end 116 and second end 118 is greater than a length between the first side 122 and the second side 124. Further, in exemplary embodiments, transitions between the closed second end 118 portion and a base portion 126, the closed first side portion 122 and the base portion 126, the closed second side portion 124 and the base portion 126, the closed second end 118 portion and closed first side portion 122, and/or the closed second end 118 portion and closed second side portion 124 are curved.

Basket 110 may generally be utilized to house excess cables 42 and/or transmission elements thereof as the cables 42 and/or transmission elements thereof are routed through the closure 10 and organizer assembly 30 thereof.

Primary basket 110 may further include an upper peripheral lip 128, which may extend between the first end 116 and second end 118, such as on the sides 122, 124, and may further extend between the sides 122, 124, such as along the closed second end 118. For example, the lip 128 may extend along an upper edge (along the traverse axis 106) of the primary basket 110, such as along the sides 122, 124 and second end 118.

In some embodiments, as illustrated in FIG. 4, a cover plate 130 may be provided. Cover plate 130 may be removably positioned on the basket 110, such as on the lip 128 thereof. Hook-and-loop fasteners or other suitable fastening apparatus may be utilized to removably fasten the cover plate 130 to the basket 110. Cover plate 130 may protect and help to secure portions of cables 42 and transmission elements thereof which are disposed in and routed through the interior 120 of basket 110.

In some embodiments, basket 110 may further include a plurality of retainer tabs 132, each of which extends from the basket 110 into the interior 120. The tabs 132 may be connected to the basket 110 at the upper edge of the basket 110, such as adjacent the lip 128. Further, in exemplary embodiments, the tabs 132 are removable. In some embodiments, for example, the tabs 132 may be removed when a secondary basket (as discussed herein) is connected. Tabs 132 may generally assist in routing and retaining cables 42 and transmission elements in the interior 120 during assembly, splicing, etc., thereof.

A connector shaft 138 may extend from the first end 116 along the longitudinal axis 102, such that at least a portion of the connector shaft 138 is exterior to the primary basket 110. The connector shaft 138 may connect to the base 40, thus connecting the organizer assembly 30 and base 40 together.

Referring now in particular to FIGS. 2 through 4 and 6 through 8, a bracket assembly 140 may extend along the transverse axis 106 from the primary basket 110, such as at the first end 116. Bracket assembly 140 may include a main body 142 and a plurality of hinge assemblies 144. The hinge assemblies 144 may be spaced apart in a linear array along the transverse axis 106. In exemplary embodiments, the hinge assemblies 144 are stepped along the transverse axis 106. In these embodiments, the linear array of the hinge assemblies 144 is angled relative to the transverse axis 106, rather than being directed along or parallel to the transverse axis 106. At least the portion of the main body 142 which includes the hinge assemblies 144 may also be so angled. Such angle may be between the transverse axis 106 and the longitudinal axis 102, as shown.

As shown in FIGS. 2 and 3, organizer assemblies 30 in accordance with the present disclosure may include a secondary basket 150 which may be rotatably and removably connectable to the bracket assembly 140. FIGS. 2 and 3 illustrate the secondary basket 150 rotatably connected to the bracket assembly 140. In exemplary embodiments, the secondary basket 150 may be connected to the bracket assembly 140 below the plurality of hinge assemblies 144 along the transverse axis 106, such as between the plurality of hinge assemblies 144 (such as the lower-most hinge assembly 144) and the interior surface 114 of the primary basket 110 along the transverse axis 106. The secondary basket 150 may be rotatable between a first position wherein the secondary basket 150 is aligned along the longitudinal axis 102 and a second position wherein the secondary basket 150 is aligned along the transverse axis 106 or at an angle between the longitudinal axis 102 and transverse axis 106 (as shown in FIGS. 2 and 3). In exemplary embodiments, the secondary basket 150 may be removable, such that it can be utilized as needed for cable 42 (and transmission elements thereof) routing and set aside/discarded when not needed.

The secondary basket 150 includes an exterior surface 152 and an interior surface 154. The secondary basket 150 may extend (such as along the longitudinal axis 102 when in the first position) between a first end 156 and a second end 158. The first end 156 may be an open end, as shown, such that cables 42 or transmission elements thereof being directed along and parallel to the longitudinal axis 102 can enter or exit an interior 160 of the secondary basket 150 through the first end 156, when the secondary basket 150 is in the first position. The second end 158 may be a closed end, as shown, such that cables 42 or transmission elements thereof being directed along and parallel to the longitudinal axis 102 cannot enter an interior 160 of the secondary basket 150 through the second end 158, and instead encounter a surface of the primary basket 110, when the secondary basket 150 is in the first position.

The secondary basket 150 may further extend along the lateral axis 104 between a first side portion 162 and a second side portion 164, both of which may be closed (as discussed above with respect to second end 118) and extending from a base portion 166. The base portion 166 extends along the longitudinal axis and the lateral axis. In exemplary embodiments, a length between the first end 156 and second end 158 is greater than a length between the first side 162 and the second side 164. Further, in exemplary embodiments, the secondary basket 150 is curved at transitions from the base portion 166 to end walls at the closed second end 158 (second end portion 158), the closed first side portion 162, the closed second side portion 164, and curved at transitions between the closed second end portion 158 and closed first side portion 162, and/or the closed second end portion 158 and closed second side portion 164.

In exemplary embodiments, the area of the interior 160 may be less than the area of the interior 120, the length between the first end 156 and second end 158 may be less than the length between the first end 116 and second end 118, and/or the length between the first side 162 and second side 164 is less than the length between the first side 122 and second side 124, such that the secondary basket 150 can fit at least partially within the primary basket 110 (such as the interior 120 thereof).

Secondary basket 150 may further include an upper peripheral lip 168, which may extend between the first end 156 and second end 158, such as on the sides 162, 164, and may further extend between the sides 162, 164, such as along the closed second end 158. For example, the lip 168 may extend along an upper edge (along the traverse axis 106) of the secondary basket 150, such as along the sides 162, 164 and second end 158.

In particular embodiments, basket 150 include a plurality of retainer tabs 172, each of which extends from the basket 150 into the interior 160. The tabs 172 may be connected to the basket 150 at the upper edge of the basket 150, such as adjacent the lip 168. Tabs 172 may generally assist in routing and retaining cables 42 and transmission elements in the interior 160 during assembly, splicing, etc., thereof.

One or more connector arms 174 may extend from the first end 156 (such as along the longitudinal axis 102 when the secondary basket 150 is in the first position). The connector arms 174 may be removably connected to the bracket assembly 140, thus rotatably connecting the secondary basket 150 thereto. For example, protrusions 176 provided on the arms 174 may be inserted in depressions 178 defined in the main body 142 to rotatably connect the secondary basket 150 thereto.

Referring again to FIGS. 2 through 4 and 6 through 8, each hinge assembly 144 may include at least one positioning tab 180 and at least one release tab 182. In some embodiments, for example, each hinge assembly 144 may include two positioning tabs 180 and a release tab 182, with the release tab 182 disposed between the positioning tabs 180 along the lateral axis 104. Each positioning tab 180 may be a generally tapered protrusion extending along the transverse axis 106 from the main body 142. Each release tab 182 may extend along the longitudinal axis 102 from the main body 142, and may thus protrude from the main body 142 farther than the positioning tab(s) 180 along the longitudinal axis 102.

Each bracket assembly 140 may further include one or more depressions 184 (which may for example be through-holes) defined in the main body 142.

Referring now to FIGS. 5 through 8 and 12 through 14, organizer assemblies 30 in accordance with the present disclosure may further include one or more organizer trays 200, such as in exemplary embodiments a plurality of organizer trays 200.

Figure 5:
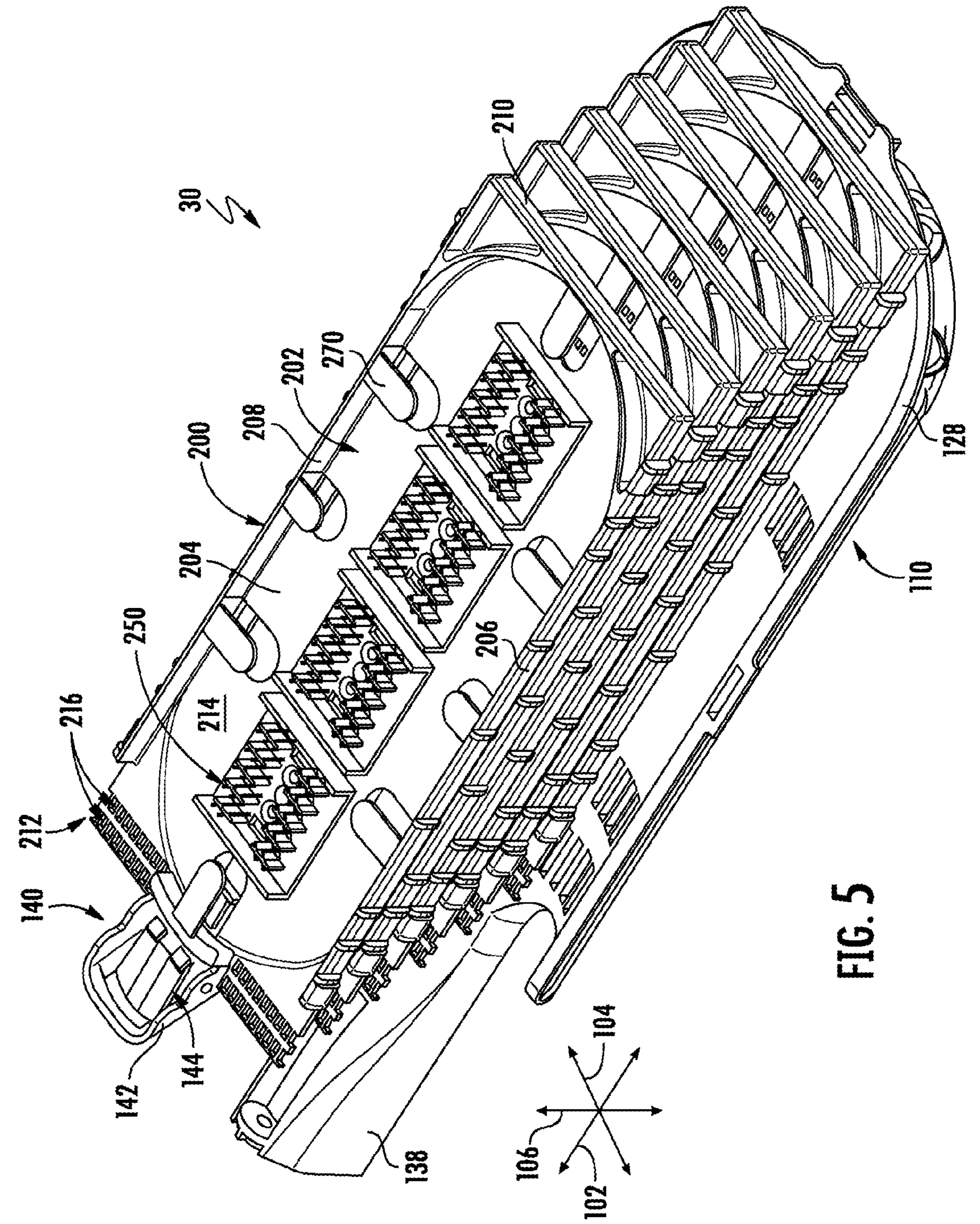
FIG. 5 is a perspective view of an organizer assembly, with a plurality of organizer trays connected thereon in first positions, in accordance with embodiments of the present disclosure.
Figure 6:
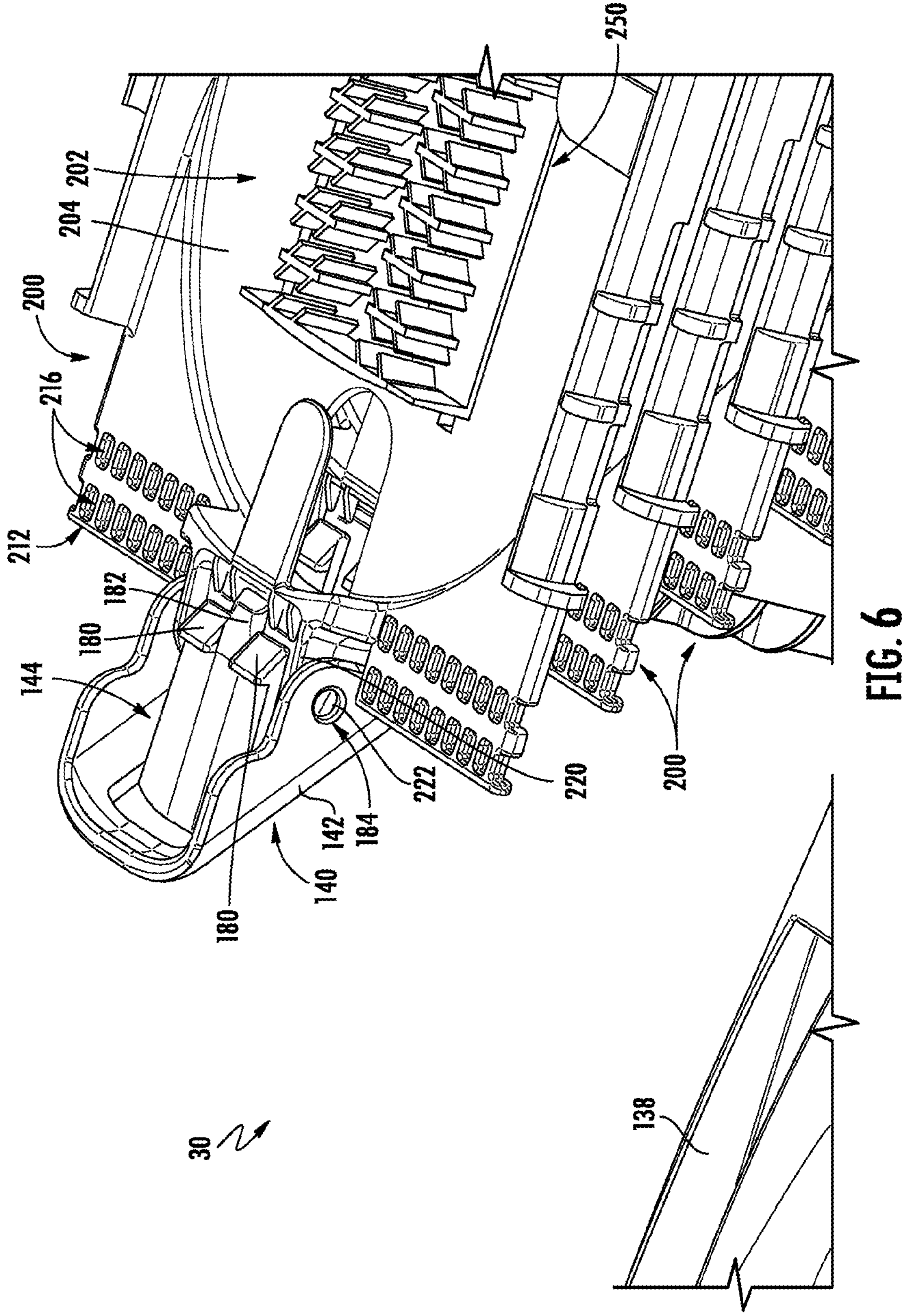
FIG. 6 is a perspective view of a portion of an organizer assembly, illustrating hinge assemblies and organizer trays with the organizer trays in first positions, in accordance with embodiments of the present disclosure.
Figure 7:
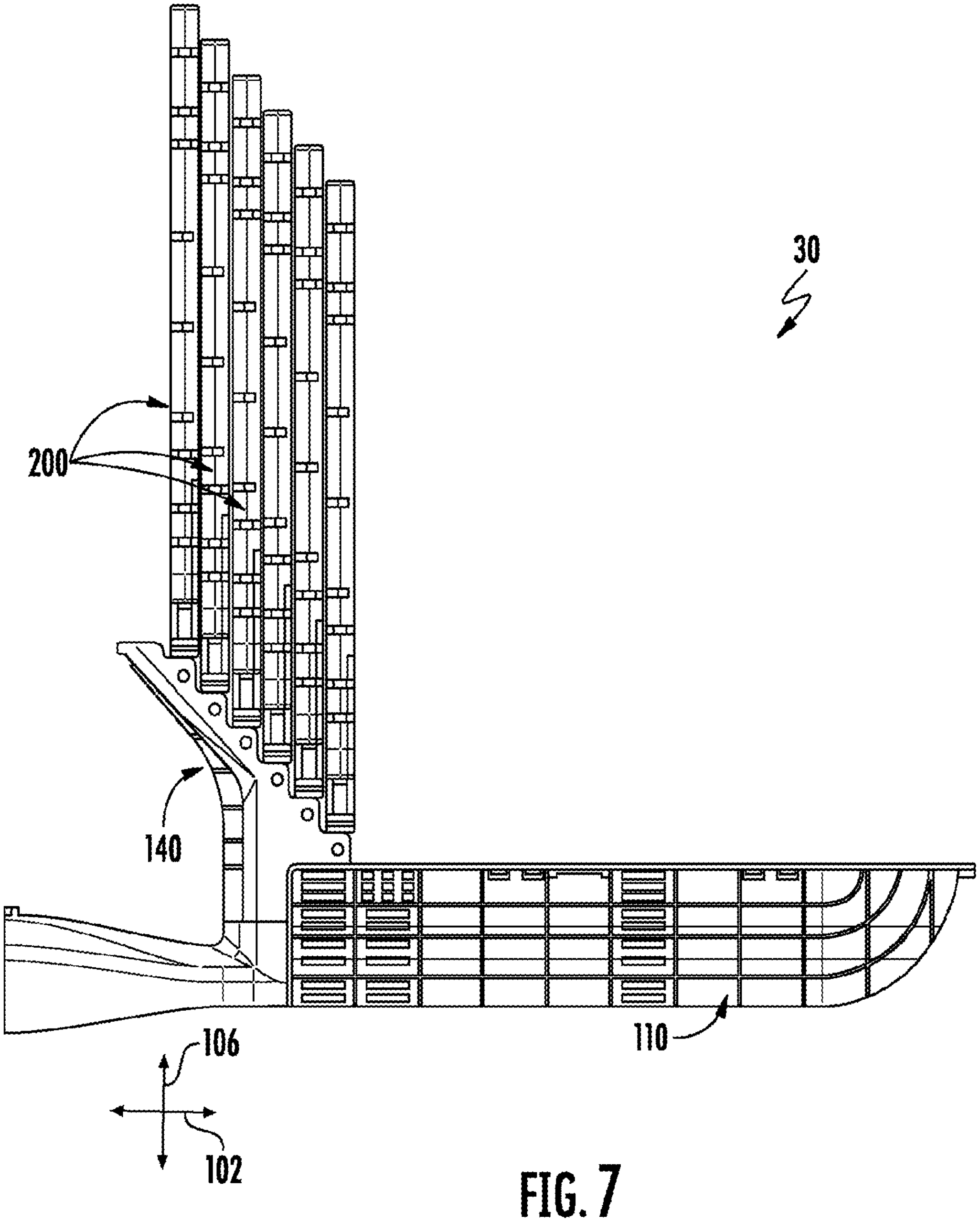
FIG. 7 is a side view of an organizer assembly, with a plurality of organizer trays connected thereon in second positions, in accordance with embodiments of the present disclosure.
Figure 8:
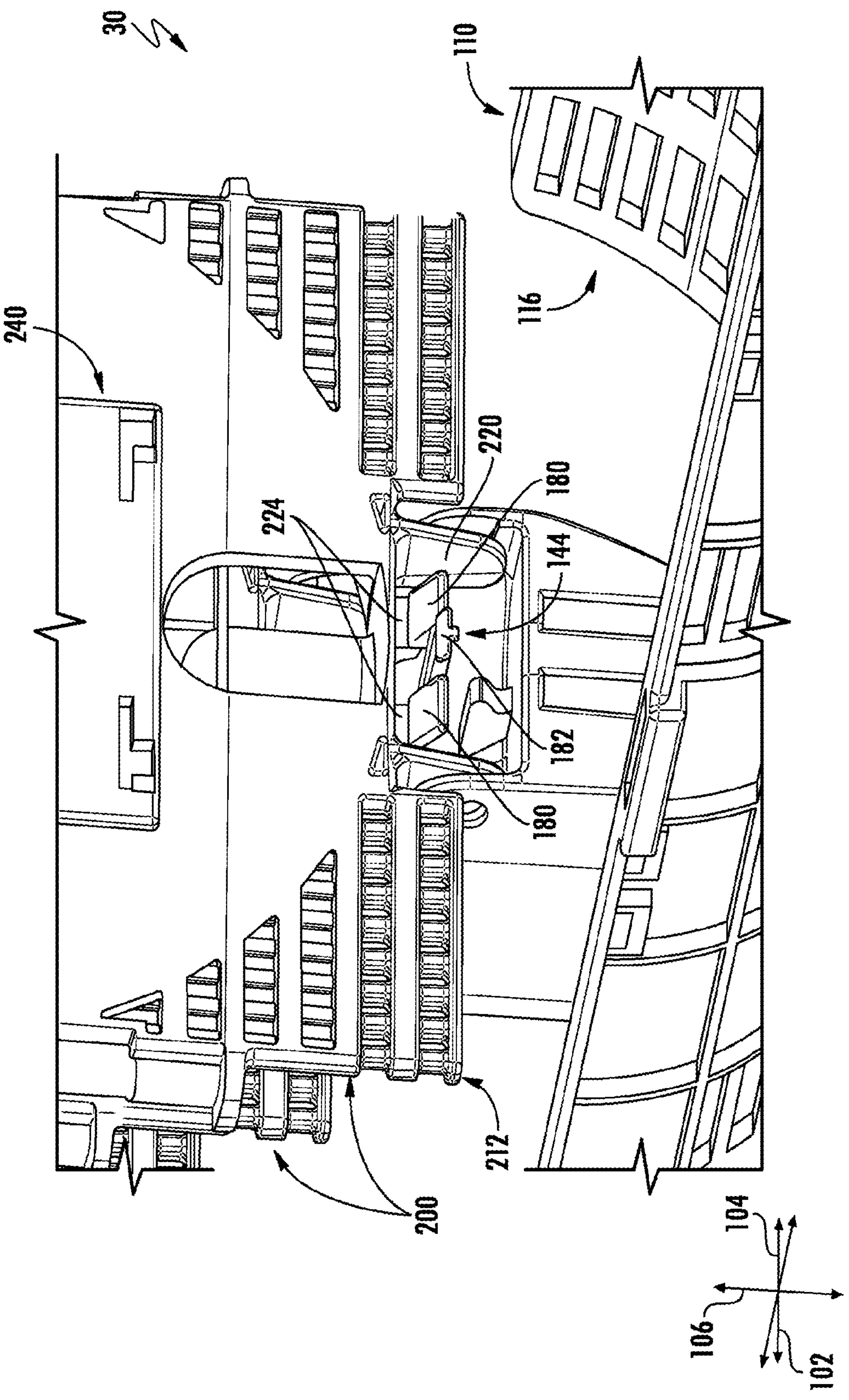
FIG. 8 is a perspective view of a portion of an organizer assembly, illustrating hinge assemblies and organizer trays with the organizer trays in second positions, in accordance with embodiments of the present disclosure.
Figure 12:
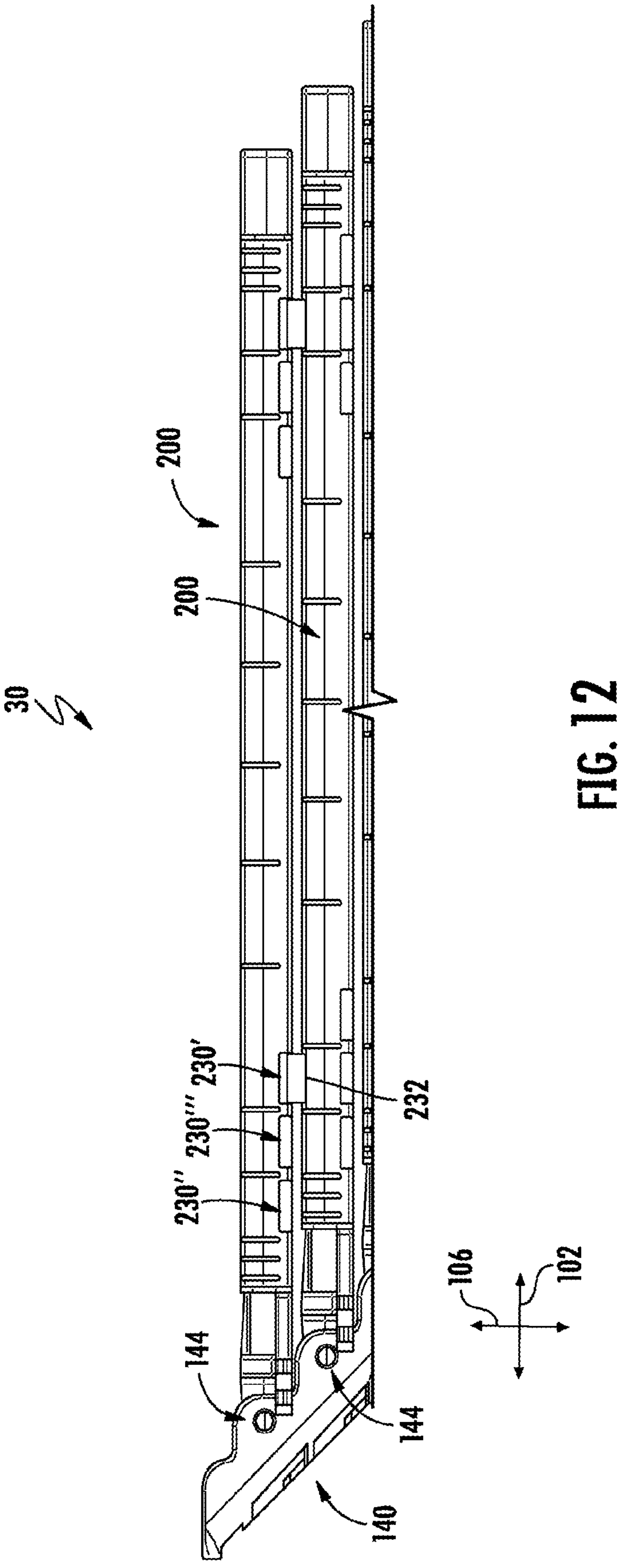
FIG. 12 is a side view of organizer trays in first positions in accordance with embodiments of the present disclosure.
Figure 13:
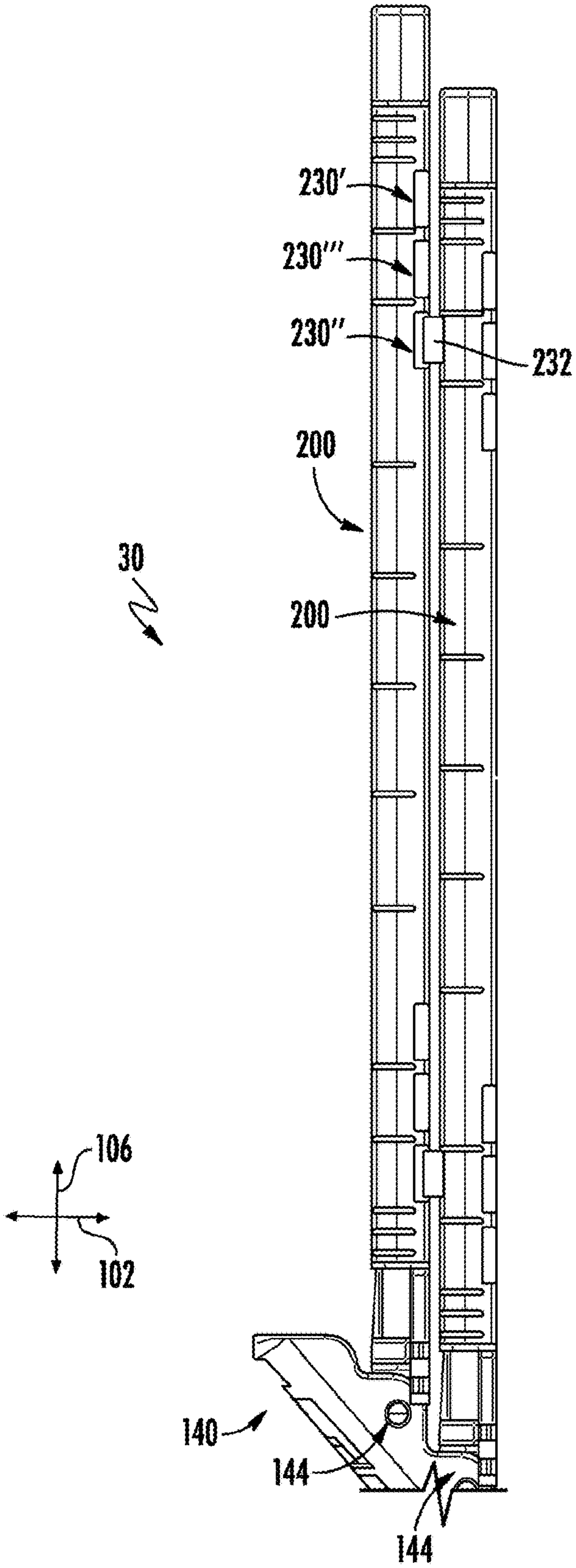
FIG. 13 is a side view of organizer trays in second positions in accordance with embodiments of the present disclosure.

Each organizer tray 200 is rotatably connectable, and thus may be rotatably connected, to the bracket assembly 140, such as to one of the plurality of hinge assemblies 144. Each organizer tray 200 may be rotatable, such as between a first position wherein the organizer tray 200 is aligned along the longitudinal axis 102 (as shown in FIGS. 5, 6, and 12) and a second position wherein the organizer tray 200 is aligned along the transverse axis 106 (as shown in FIGS. 7, 8, and 13).

For example, each organizer tray 200 may include a main body 202. Main body 202 may, for example, include a base wall 204, a first sidewall 206, a second sidewall 208, and a front wall 210, and may further define a rear end 212. First sidewall 206 and second sidewall 208 may be spaced apart along the lateral axis 104. Front wall 210 and rear end 212 may be spaced apart (such as along the longitudinal axis 102 when in the first position). The rear end 212 may be an open end, as shown, such that cables 42 or transmission elements thereof being directed along and parallel to the longitudinal axis 102 can enter or exit an interior 214 of the organizer tray 200 through the rear end 212, when the organizer tray 200 is in the first position. The front wall 210 and sidewalls 206, 208 may define a closed end and closed sides.

In some embodiments, a plurality of apertures 216 may be defined in the base wall 204, such as at the rear end 212. Each aperture 216 may be utilized to secure a cable 42 (or transmission element thereof) directly to the base wall 204 and organizer tray 200 thereof, such as using a suitable zip-tie or other suitable fastener. Notably, no additional cable/transmission element securement components are included on the organizer tray 200.

Organizer tray 200 may further include one or more connector arms 220 which may extend from the main body 202. For example, each connector arm 220 may extend from the base wall 204, such as along the transverse axis 106 when in the first position. The connector arms 220 may be removably connected to the hinge assembly 144, thus rotatably connecting the organizer tray 200 thereto. For example, protrusions 222 provided on the arms 220 may be inserted in depressions 184 to rotatably connect the organizer tray 200 to the hinge assembly 144.

As discussed, each of the plurality of organizer trays 200 may be rotatable between a first position and a second position. Further, each organizer tray 200 may advantageously be releasably securable in the second position, thus facilitating efficient loading of cables 42 and transmission elements thereof, splicing, etc., into other organizer trays 200 and the assembly 30 generally. The hinge assembly 144 which rotatable connects the organizer tray 200 to the bracket assembly 140 may releasably secure the organizer tray 200 in the second position.

For example, in exemplary embodiments as illustrated in FIG. 8, the one or more positioning tabs 182 of the associated hinge assembly 144 may contact and releasably secure the organizer tray 200 in the second position. In some embodiments, the organizer tray 200 may include one or more contact tabs 224, each of which extends from the rear end 212 of the body 202. When the organizer tray 200 is moved to the second position, each contact tab 224 may contact a positioning tab 182 and releasably secure the organizer tray 200 in the second position. For example, each contact tab 224 may ride up the tapered front surface of a positioning tab 182 and then rest in contact with a rear surface of the positioning tab 182 when the organizer tray 200 reaches the second position.

Further, in exemplary embodiments, the organizer tray 200 may be released from being secured in the second position to move from the second position to the first position. For example, movement of the release tab 182 may cause movement of the positioning tab(s) 180 out of contact with the organizer tray 200 (such as the contact tab(s) 224) thereof such that the organizer tray 200 can move from the second position to the first position. In exemplary embodiments, a user may apply force to the release tab 182 to cause such movement. For example, such force may pivot the release tab 182 and, due to a material connection between the release tab 182 and positioning tab(s) 180, also cause pivoting of the positioning tab(s) 180.

Figure 14:
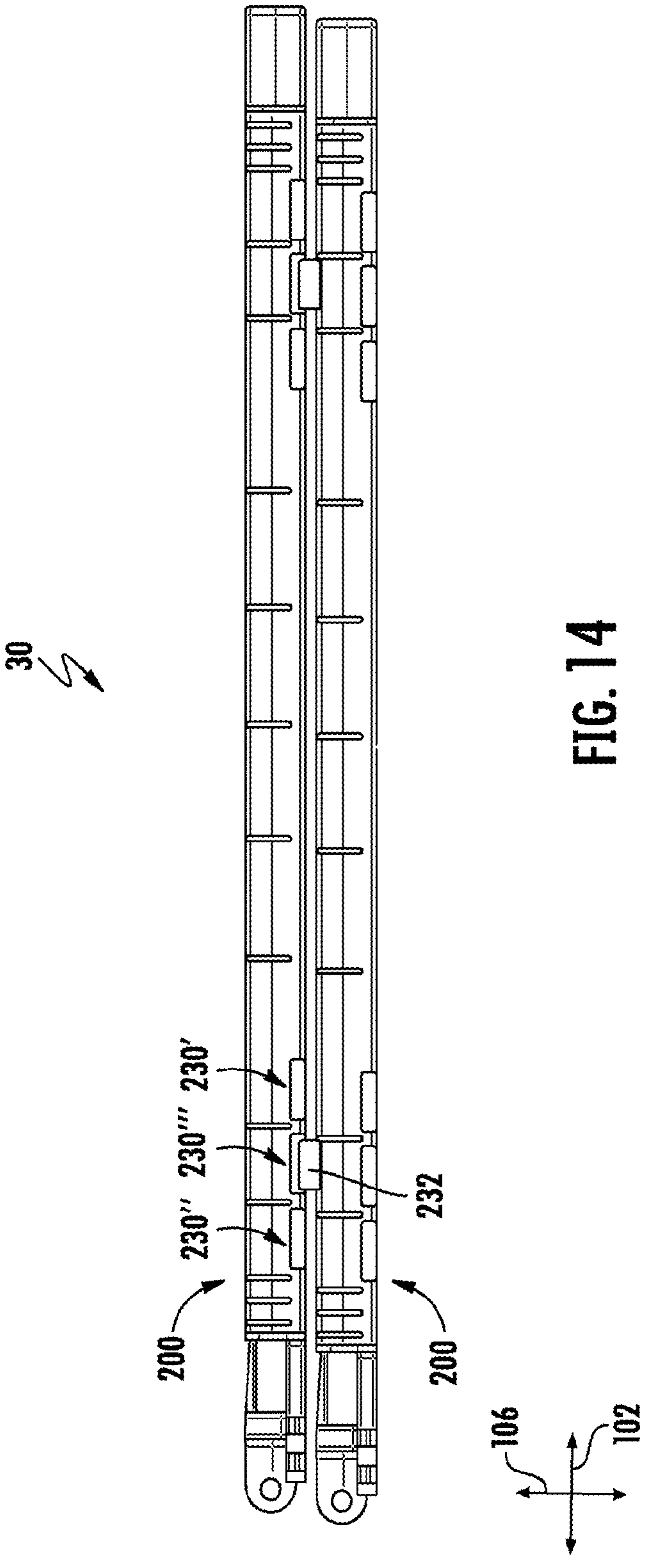
FIG. 14 is a side view of organizer trays removed and stacked in accordance with embodiments of the present disclosure.

Referring now in particular to FIGS. 12 through 14, each organizer tray 200 may advantageously include features for ensuring and securing proper positioning of the organizer trays 200 relative to each other in the first and second positions. For example, each organizer tray 200 may include one or more pluralities of positioning slots 230 and one or more positioning tabs 232. The slots 230 may, for example, be defined in exterior surfaces of the first sidewall 206 and/or second sidewall 208, such as adjacent or at the base wall 204. The positioning tab(s) 232 may extend from the first sidewall 206 and/or second sidewall 208, such as at a top of the organizer tray 200 opposite the base wall 204.

Advantageously, a positioning tab 232 of an organizer tray 200' may be inserted into a different positioning slot 230 of a plurality of positioning slots 230 in a neighboring organizer tray 200" depending on the positions of the organizer trays 200. For example, a positioning tab 232 of an organizer tray 200' may be inserted in one of the plurality of positioning slots 230' of a neighboring organizer tray 200" when these trays 200', 200" (such as, for example, the plurality of organizer trays 200) is in the first position (see FIG. 12). The positioning tab 232 of the organizer tray 200' may be inserted in another one of the plurality of positioning slots 230" of the neighboring organizer tray 200" when these trays 200', 200" (such as, for example, the plurality of organizer trays 200) is in the second position (see FIG. 13).

As discussed, in some embodiments the organizer trays 200 may be removable from the bracket assembly 140 and organizer assembly 30 generally. In some embodiments, the positioning tab 232 of the organizer tray 200' may further be inserted in yet another one of the plurality of positioning slots 230''' of the neighboring organizer tray 200" when these trays 200', 200" (such as, for example, the plurality of organizer trays 200) are removed from the bracket assembly 140 and stacked together, such as in a vertical array (see FIG. 14). Accordingly, organization and retention of the organizer trays 200 is advantageously facilitated even when the organizer trays 200 are not connected to the bracket assembly 140 and organizer assembly 30 generally.

Figure 9:
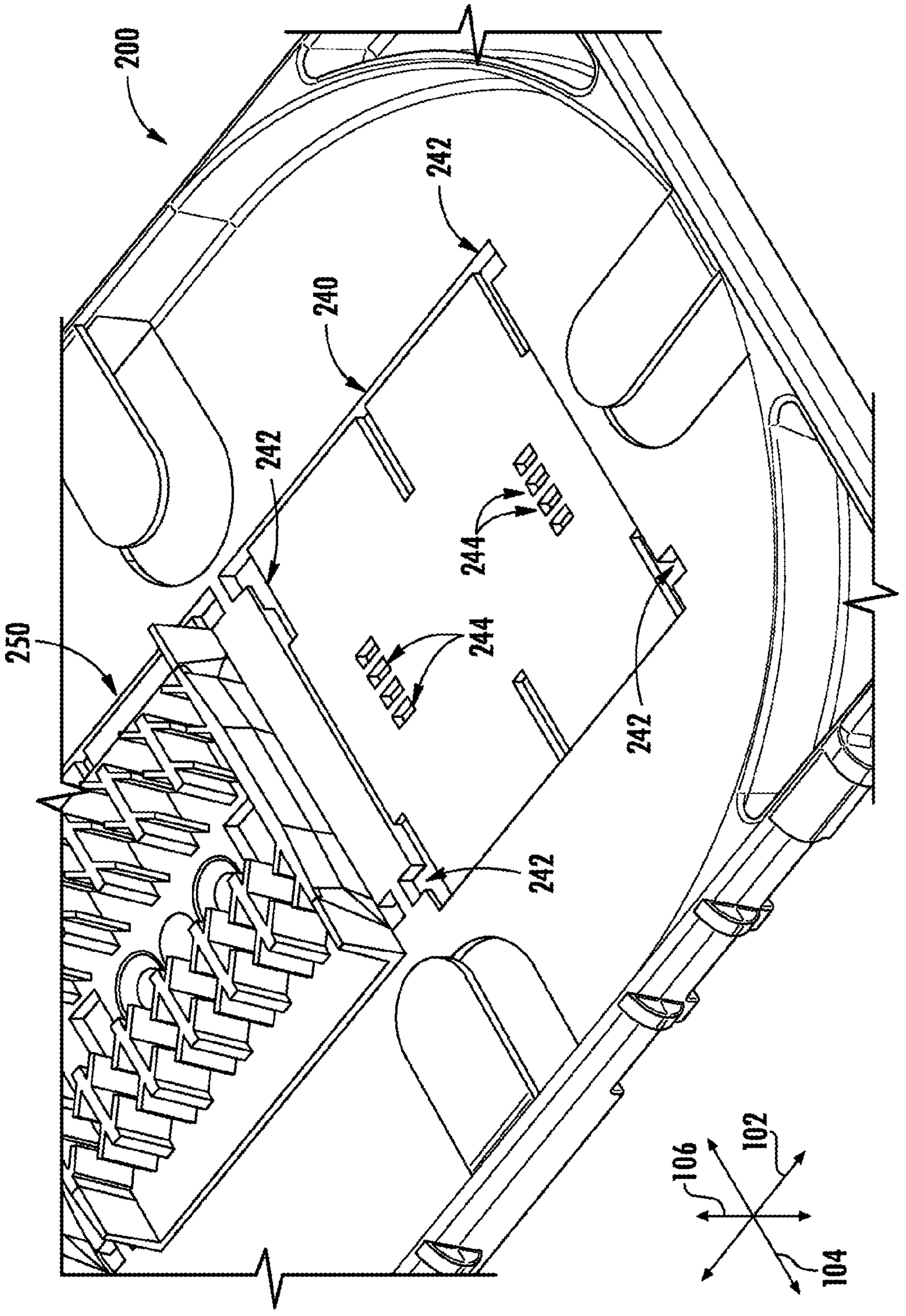
FIG. 9 is a perspective view illustrating a module mounting location in accordance with embodiments of the present disclosure.
Figure 10:
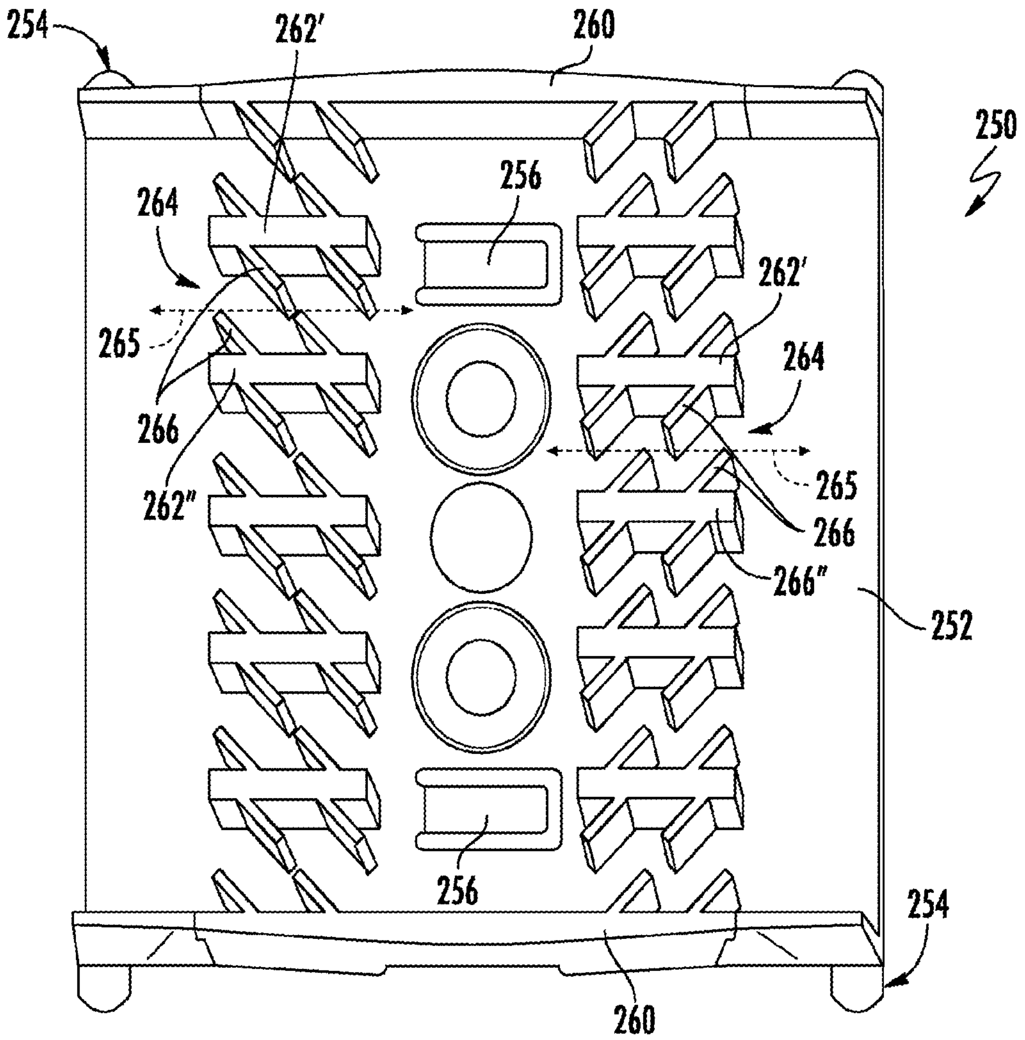
FIG. 10 is a perspective view of a splice module in accordance with embodiments of the present disclosure.
Figure 11:
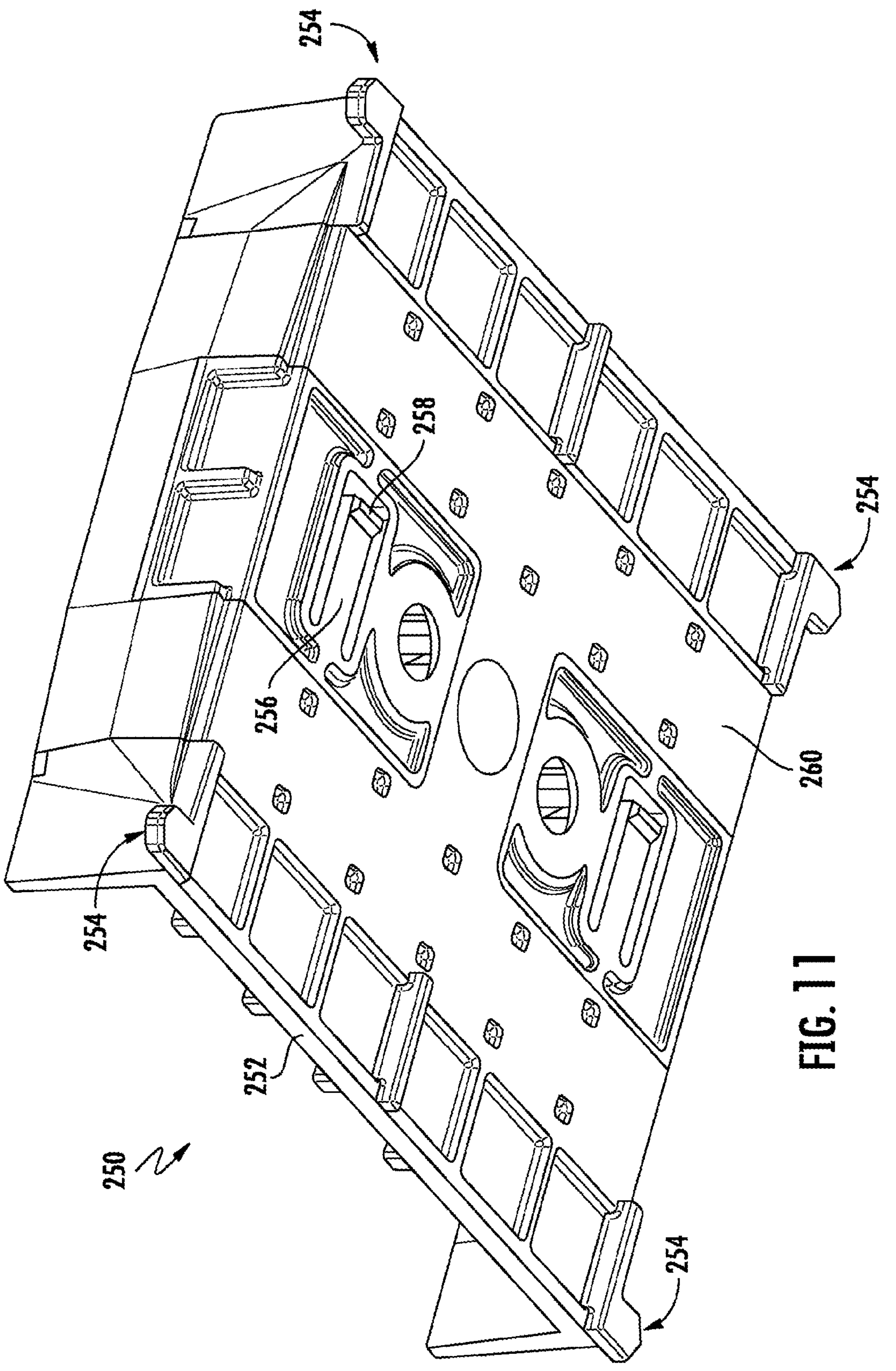
FIG. 11 is a bottom perspective view of a splice module in accordance with embodiments of the present disclosure.

Referring now in particular to FIGS. 9 through 11, each organizer tray 200 and deep tray 300 may generally accommodate one or more splice modules 250. Each splice module 250 may be removable connected to the organizer tray 200 or deep tray 300, such as to the base wall 204, 304 thereof. For example, base wall 204, 304 may include a plurality of module mounting locations 240. In exemplary embodiments, each of the module mounting locations 240 may include a plurality of leg slots 242 which may be defined through the base wall 204, 304 and one or more pluralities of positioning slots 244 which may be defined through the base wall 204, 304. The leg slots 242 may, for example, define at least a portion of a periphery of the module mounting location 240, and may for example, be disposed at corners of the module mounting location 240. Each plurality of positioning slots 244 may be defined within the periphery of the module mounting location 240, and may for example extend in a linear array. The leg slots 242 and positioning slots 244 may generally facilitate removable connection of a splice module 250 to the organizer tray at a module mounting location 240.

Each splice module 250 may, for example, include a base 252 and a plurality of legs 254 extending from the base 252, such as below the base 252 as shown. The legs 254 may further extend from and at least partially define a periphery of the base 252, and may further be disposed at corners of the base 252. To removably connect a splice module 250 to an organizer tray 200 at a module mounting location 240, each leg 254 may be inserted into one of the leg slots 242 of a module mounting location 240. Further, a splice module 250 may include one or more cantilevered arms 256 extending from the base 252, such as below the base 252 as shown. Each cantilevered arm 256 may include a tab 258 at a distal end thereof. To removably connect a splice module 250 to an organizer tray 200 at a module mounting location 240, the cantilevered arm 256, such as the tab 258 thereof, may be inserted in one of a plurality of positioning slots 244 of a module mounting location 240.

In exemplary embodiments, a splice module 250 may be removably connectable to an organizer tray 200, such as at a module mounting location 240, in multiple different orientations. For example, the plurality of positioning slots 244 may be oriented such that the cantilevered arm 256, such as the tab 258 thereof, may be inserted in a different one of a plurality of positioning slots 244 depending on the orientation of the splice module 250.

Splice modules 250 in accordance with the present disclosure may advantageously be dual material components. For example, splice modules 250 may further include one or more module walls or overmolded portions 260 which are disposed on portions of the base 252, such as on a lower surface and sidewalls thereof. The overmolded portions 260 advantageously provide improved structural integrity, rigidity, and protection. The base 252, as well as the legs 254 and cantilevered arms 256 thereof, may for example, be formed from a hard plastic such as polycarbonate or nylon. The overmolded portions 260 may be formed from suitable elastomers, such as vulcanized elastomers.

Splice modules 250 in accordance with the present disclosure may further include a plurality of partitions 262, each of which may extend from the base 252. The partitions 262 may be generally parallel to each other, and neighboring partitions 262 may define channels 264 therebetween. Partitions 262 extending from the module wall or portion 260 extend along a direction between the lateral axis and the longitudinal axis, such as an oblique direction. The partition 262 may be deformable to allow a splice sleeve (e.g., splice sleeve 502) to affix to the splice module between pairs of module walls or overmolded portions 260. Each channel 264 may define and extend along a longitudinal channel axis 265, as shown. Further, one or more arms 266 may extend from one or more of the neighboring partitions 262 into one or more of the channels 264 defined by such neighboring partitions 262. Such arms 266 may extend into the channels 264 at an angle to the longitudinal channel axis 265, as shown. For example, a first partition 262' of neighboring partitions 262 may include one or more arms 266 extending into a channel 264 defined by the neighboring partitions 262, and a second partition 262" of neighboring partitions 262 may include one or more arms 266 extending into the channel 264 defined by the neighboring partitions 262. Further, in exemplary embodiments as shown, the one or more arms 266 extending into a channel 264 from a first partition 262' may extend in a direction opposite the direction of the one or more arms 266 extending into the channel 264 from a second partition 262".

In exemplary embodiments, partitions 262 and arms 266 of splice modules 250 may be formed from suitable elastomers, such as vulcanized elastomers.

Splice modules 250 in accordance with the present disclosure, and in particular the configuration of the partitions 262 and arms 266, are particularly advantageous due to their versatility and flexibility in accommodating various components. For example, a channel 264 of a splice module 250 may be capable of holding triple-stacked single spliced transmission elements, double-stacked ribbon spliced transmission elements, mechanical splices, splitter modules from 1:2 to 1:32, PLCs, etc.

Organizer trays 200 may further include one or more retainer tabs 270, each of which may extend from a wall, such wall 206, 208, or 210, into the interior 214. Such retainer tabs 270 may generally assist in routing and retaining cables 42 and transmission elements in the interior 214 during assembly, splicing, etc., thereof.

Referring now to FIGS. 15-18, embodiments of a deep organizer tray 300 (hereinafter, "deep tray 300") are provided. The deep tray 300 may be configured substantially similarly as described with regard to the organizer trays 200. The deep tray 300 includes a main body 302 having a plurality of walls including a base wall 304, a first sidewall 306, a second sidewall 308, and a front wall 310, and may further define a rear end 312. The rear end 312 may include an aft wall 318. First sidewall 306 and second sidewall 308 may be spaced apart along the lateral axis 104. Front wall 310 and rear end 312 may be spaced apart (such as along the longitudinal axis 102 when in the first position). The rear end 312 may be an open end, as shown, such that cables 42 or transmission elements thereof being directed along and parallel to the longitudinal axis 102 can enter or exit an interior 314 of the deep tray 300 through the rear end 312, when the deep tray 300 is in the first position. The front wall 310 and sidewalls 306, 308 may define a closed end and closed sides.

A plurality of tabs 370 is extended from one or more of the first sidewall 306, the second sidewall 308, the front wall 310, or the aft wall 318. The plurality of tabs 370 each extend toward the interior 314 from the respective wall, such as along the lateral axis 104 from the sidewalls 306, 308, or along the longitudinal axis 102 from the front wall 310. The plurality of tabs 370 at the deep tray 300 include an upper retention tab 372 extending from one or more of the first sidewall 306, the second sidewall 308, or front wall 310. The plurality of tabs 370 further include a lower retention tab 374 extending from one or more of the first sidewall 306, the second sidewall 308, front wall 310, or the hinge assembly 344.

The lower retention tab 374 is positioned proximate along the transverse axis to a base wall 304 relative to the upper retention tab 372. The upper retention tab 372 may particularly extend from, or approximately from, an upper peripheral edge 368 of the deep tray 300 along the transverse axis 106. The edge 368 may extend along the sidewalls 306, 308 and the front wall 310. The deep tray 300 may have any appropriate depth from the base wall 304 to the upper edge 368. In a particular embodiment, the edge 368 is approximately 1.75 inches to approximately 2.75 inches from the base wall 304. The upper retention tab 372 may extend from the wall 306, 308, 310 from between approximately 80% to approximately 100% of a distance of the wall along the transverse axis 106. The lower retention tab 374 may extend from the wall 306, 308, 310 from between approximately 40% to approximately 60% of a distance of the wall along the transverse axis 106.

Figure 15:
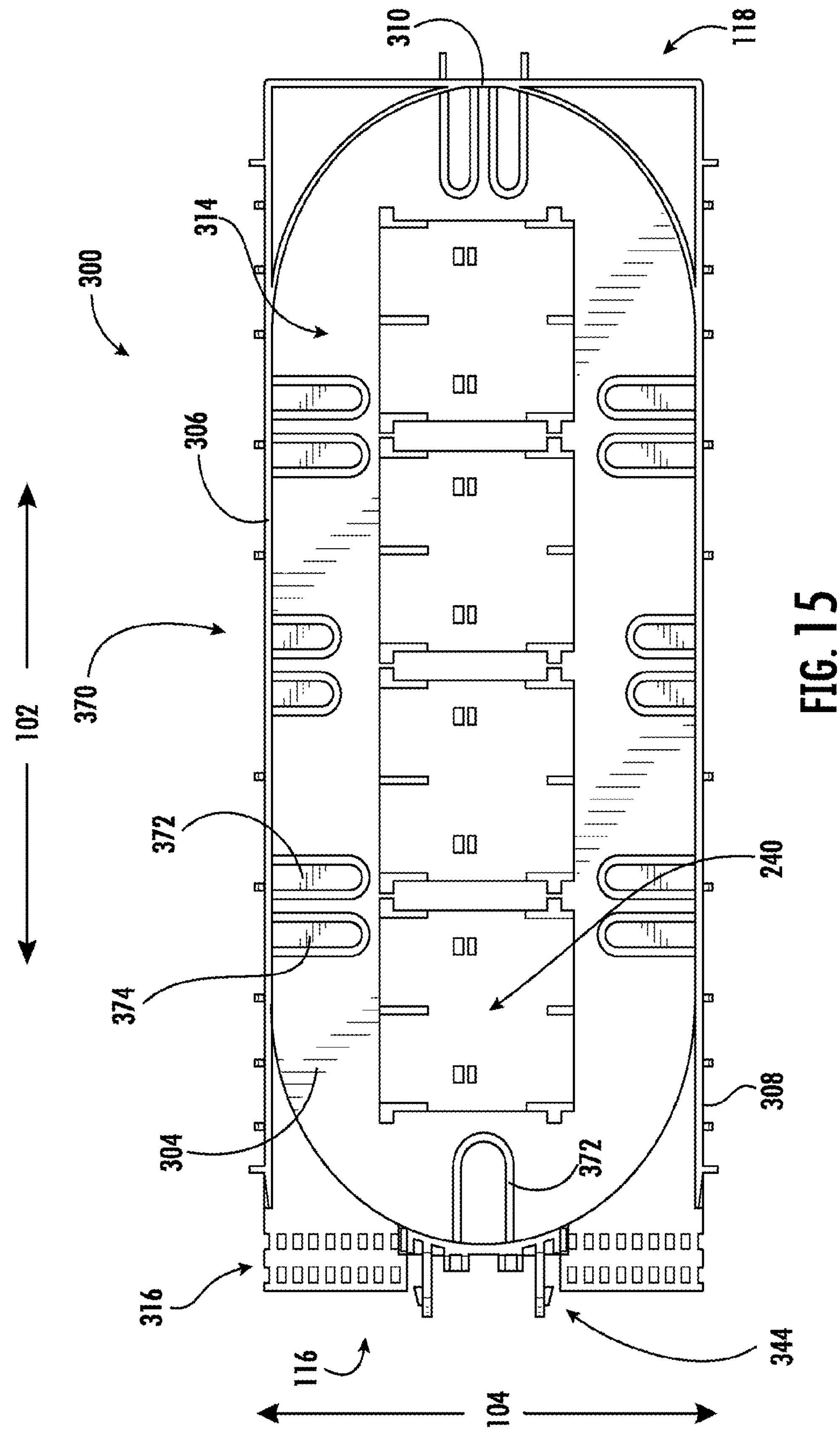
FIG. 15 is a top-down view of a deep tray in accordance with embodiments of the present disclosure.
Figure 16:
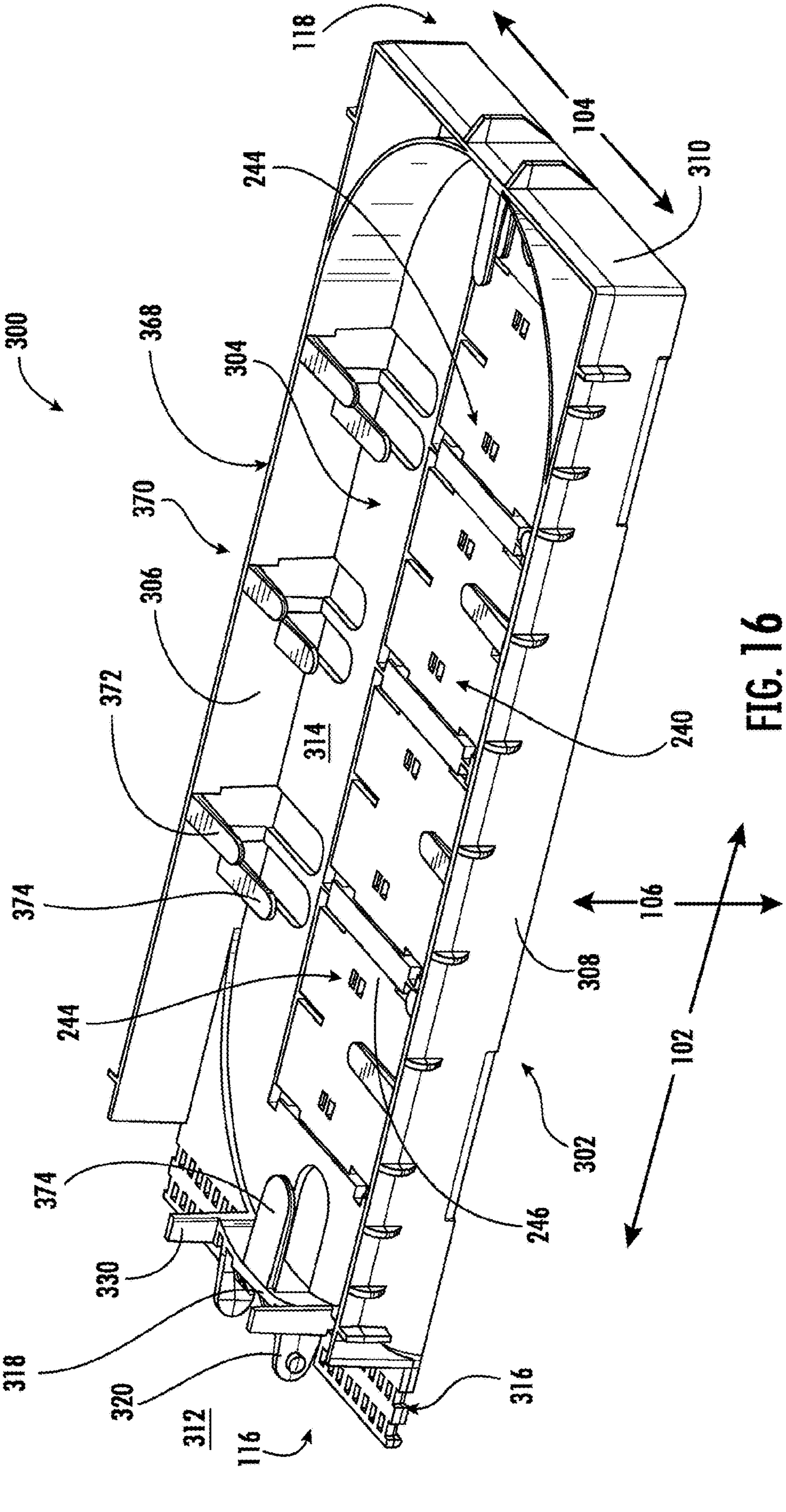
FIG. 16 is a perspective view of a deep tray in accordance with embodiments of the present disclosure.
Figure 17:
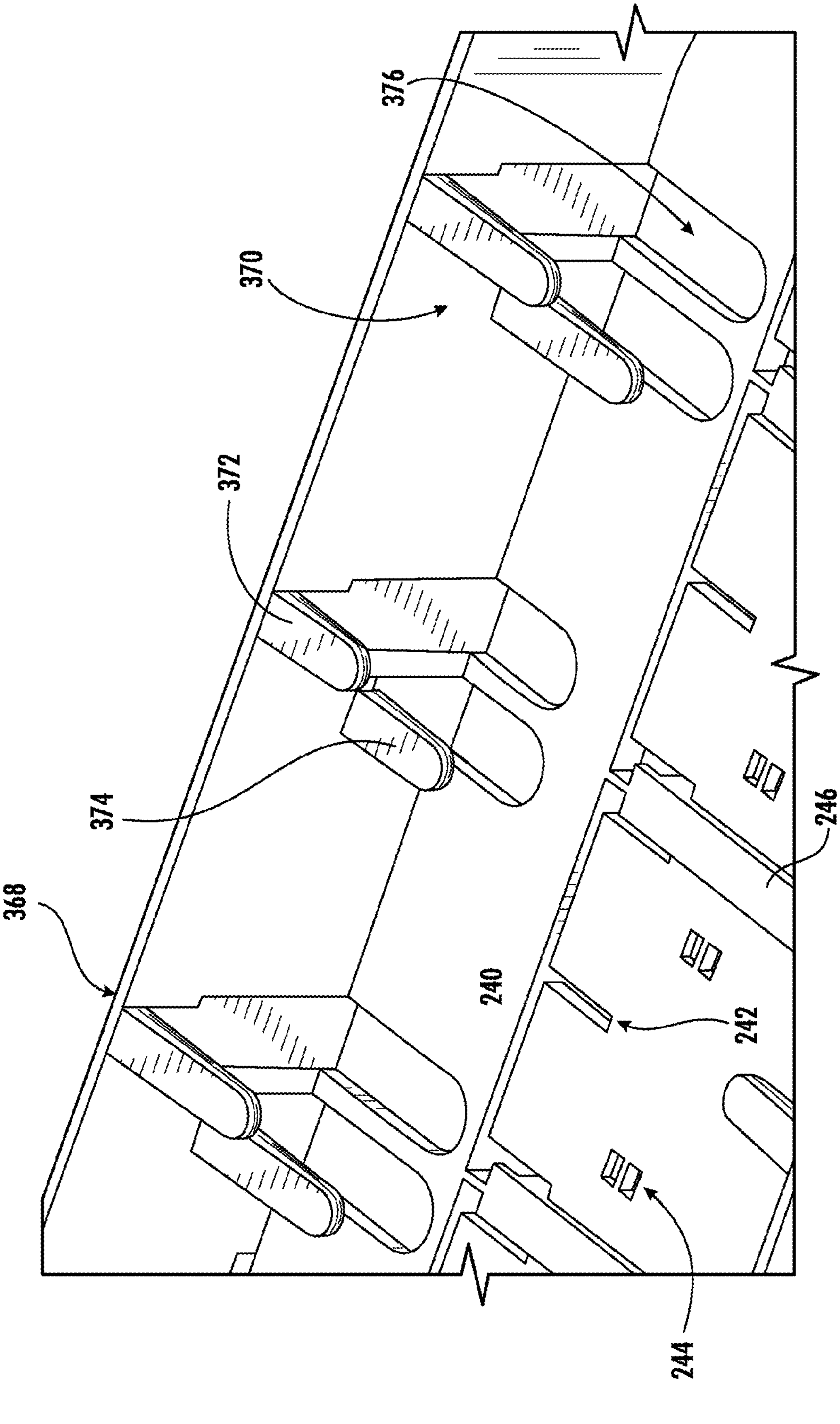
FIG. 17 is a perspective view of a portion of the deep tray in accordance with embodiments of the present disclosure.
Figure 18:
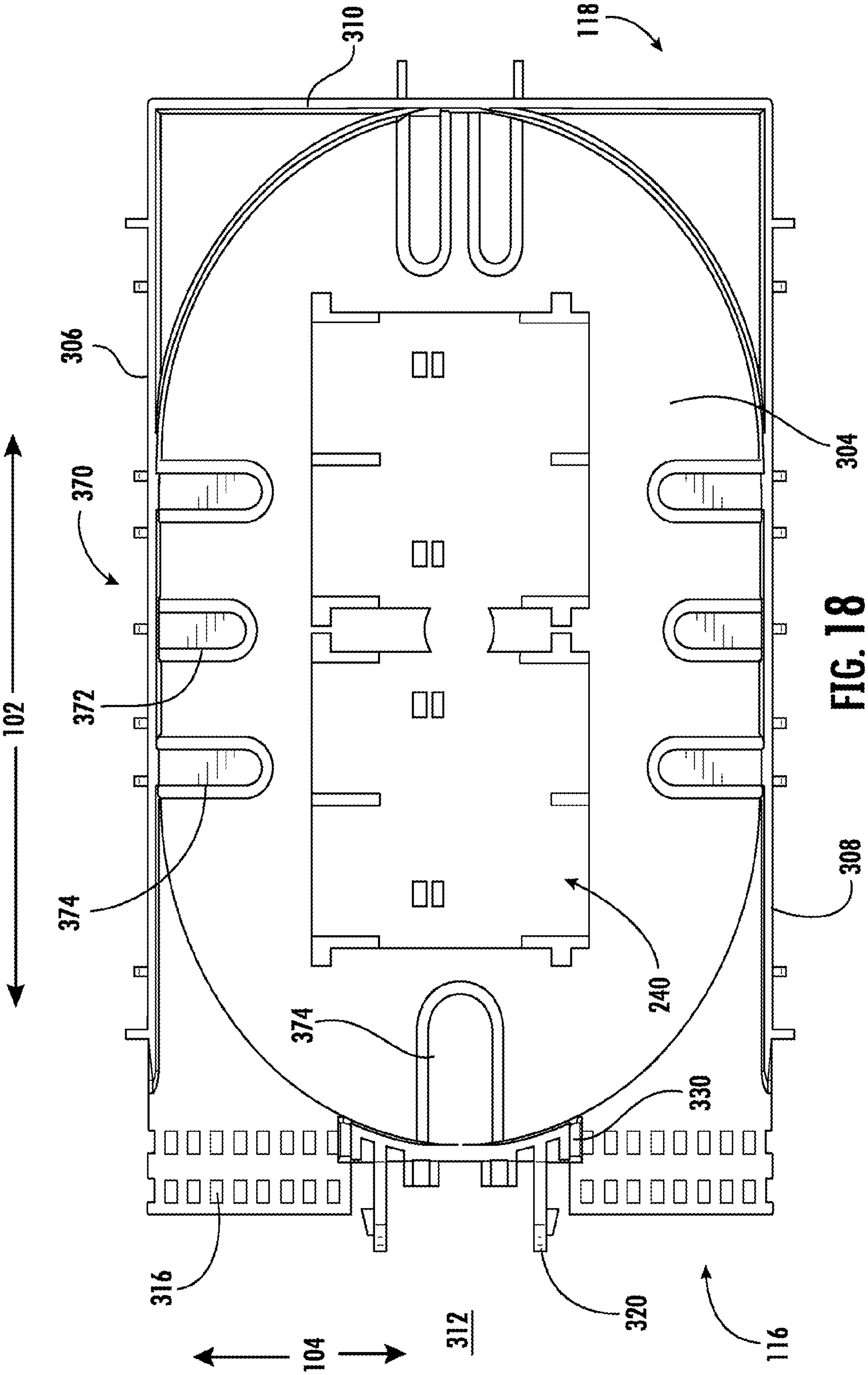
FIG. 18 is a top-down view of a deep tray in accordance with embodiments of the present disclosure.

In particular embodiments, such as depicted in FIGS. 15-17, the plurality of retention tabs 370 are formed in pairs including the upper retention tab 372 and the lower retention tab 374. In another embodiment, such as depicted in FIG. 18, the plurality of retention tabs 370 include combinations of one or more upper retention tabs 372 and one or more lower retention tabs 374. For instance, the plurality of retention tabs 370 may be positioned in triplets including a pair of lower retention tabs 374 and a single upper retention tab 372, or a pair of upper retention tabs 372 and a single lower retention tab 374.

The plurality of pairs of retention tabs 370 may include a first pair in which the upper retention tab 372 and the lower retention tab 374 extend further along the lateral axis 104 relative to a second pair of the upper retention tab 372 and the lower retention tab 374. The second pair of the upper retention tab 372 and the lower retention tab 374 may be positioned along the longitudinal axis 102 between two or more of the first pair of the upper retention tab 372 and the lower retention tab 374.

In certain embodiments, the plurality of pairs of retention tabs 370 is extending from each of the first sidewall 306 and the second sidewall 308, and the second pair of retention tabs 370 is positioned at the first sidewall 306 opposite along the lateral axis 104 of the second pair of retention tabs 370 positioned at the second sidewall 308.

Referring to FIGS. 15-18, the upper retention tab 372 may be offset along the longitudinal axis 102 relative to the lower retention tab 374. In particular embodiments, the upper retention tab 372 is non-overlapping along the transverse axis 106 relative to the lower retention tab 374. For instance, in the embodiment depicted in FIG. 15, the upper retention tab 372 may be offset along the longitudinal axis 102 such that the upper retention tab 372 does not overlap the lower retention tab 374 when viewed along the transverse axis 106. The upper retention tab 372 may be offset from a respective lower retention tab 374 within a distance of five tab widths along the longitudinal axis 102, or within three tab widths along the longitudinal axis 102. Such arrangement may desirably allow for routing and retaining cable 42 and transmission elements in the interior 314 during assembly, splicing, etc. The upper and lower retention tabs 372, 374 may furthermore allow for separation of slack storage loops, allowing for minimizing difficulty in storing flat ribbon fiber optics, such as 12-fiber flat ribbon fiber optics. The two-tiered upper and lower retention tabs may furthermore provide such benefits while allowing for any known storage methods while increasing capacity or area at which the fibers may be routed. The reduction of entanglement may reduce difficulties in storing fiber optic ribbons while reducing risks of attenuation of the fibers.

The upper and lower retention tabs 372, 374 may generate slack storage space for fiber optics, such as flat ribbon fiber optics, allowing for technicians to perform splices without necessitating pulling fiber from an enclosure basket. Such structures may allow for improved accessibility and decreased installation time.

Figure 19:
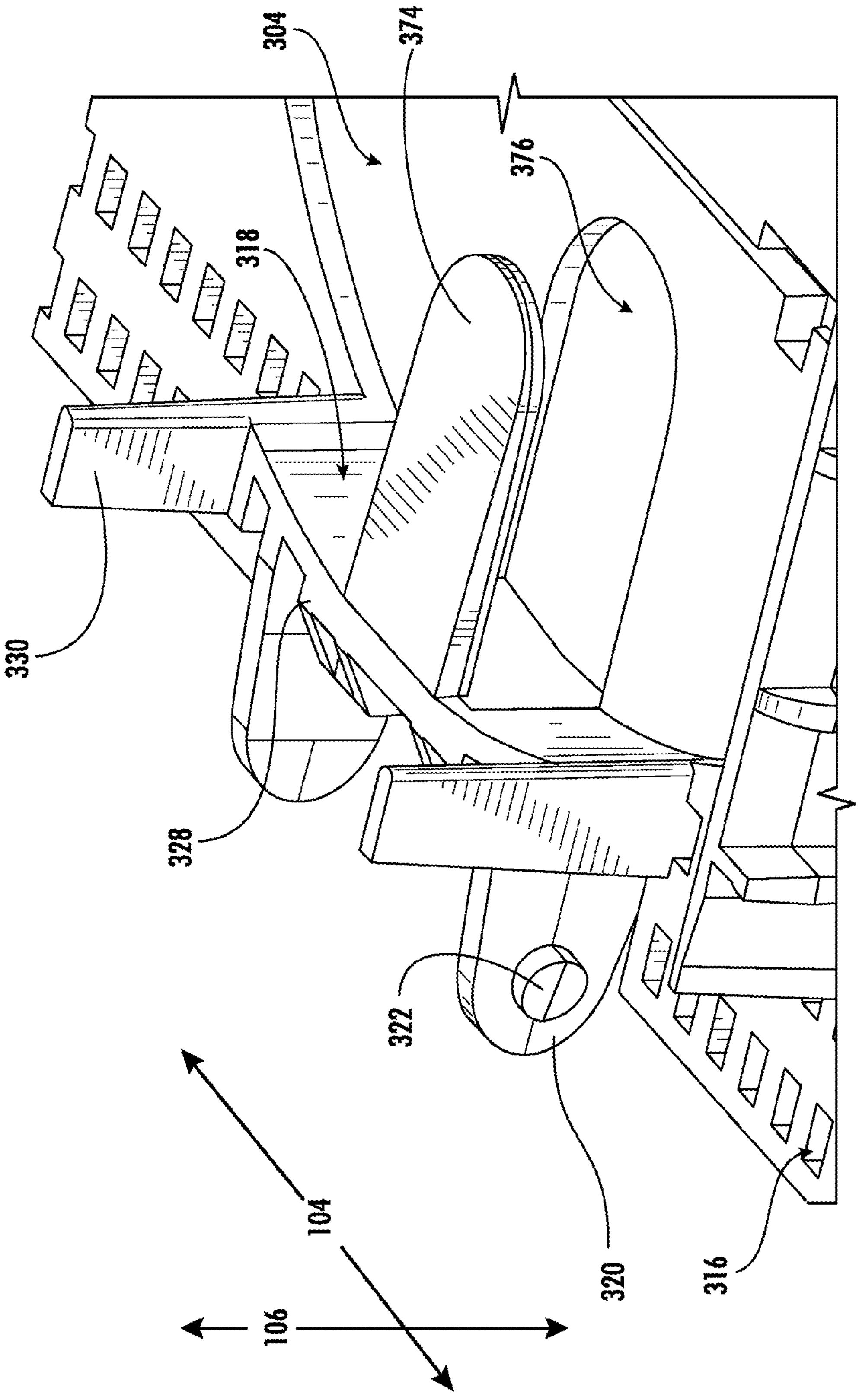
FIG. 19 is a perspective view of a portion of the deep tray in accordance with embodiments of the present disclosure.

Referring now to FIG. 19, the deep tray 300 includes one or more connector arms 320 extending from the main body 302, such as described with regard to connector arm 220 at the organizer tray 200. Connector arm 320 may include protrusion 322, such as described with regard to protrusion 222 at arm 220 and depression 178. The deep tray 300 may form an aft wall 318 extending from the base wall 304 along the lateral axis 104. The aft wall 318 further extends along the transverse axis 106. The aft wall 318 may particularly extend partly along the lateral axis 104, such that a plurality of apertures 316 is formed through the base wall 304 between the aft wall 318 and one or both sidewalls 306, 308. The aft wall 318 may additionally extend partly along the transverse axis 106 relative to an extension of the sidewalls 306, 308 along the transverse axis 106. The aft wall 318 is positioned at the rear end 312 of the deep tray 300.

In various embodiments, the aft wall 318 may extend such that an upper edge 328 of the aft wall 318 along the transverse axis 106 is approximately co-planar to the lower retention tab 374. Accordingly, in certain embodiments, the aft wall 318 may extend to approximately 40% to approximately 60% of the distance of the sidewalls 306, 308 along the transverse axis 106.

Referring still to FIG. 19, the deep tray 300 may include one or more fiber retention posts 330 extending along the transverse axis 106. The post 330 is positioned at one or more ends of the aft wall 318, such as between the aft wall 318 and the plurality of apertures 316 along the lateral axis 104. The post 330 may extend along the transverse axis 106 at least the distance of the aft wall 318 along the transverse axis 106. In some embodiments, the post 330 extends at least the distance of the sidewalls 306, 308 or the front wall 310 along the transverse axis 106. The post 330 may allow for pluralities of the organizer tray 200 and/or deep tray 300 to be stacked along the transverse axis 106, such that the post 330 contacts a bottom side of the base wall of the adjacent tray. The post 330 may further position the connector arm 220, 320 of the adjacent tray 200, 300 proximate to every other row of depressions 178 along the transverse axis 106. The post 330 may be configured to extend along the transverse axis 106 based on the position of the depression 178 along the transverse axis 106. When the organizer tray and/or deep tray is in a first position, the tray may be oriented substantially flat along the longitudinal axis 102, or within approximately 15 degrees greater than or lesser than the longitudinal axis 102.

In certain embodiments, the one or more connector arms 320, or a pair of connector arms 320, is extending along the longitudinal axis 102 from between (along the lateral axis 104) a pair of fiber retention posts 330. The post 330 may allow for one or more organizer trays 200 to stack on top of the deep tray 300 and hinge with the hinge assembly 144 such as described herein. Openings 376 formed into the base wall 304 may allow for space between tabs 270, 370 at an organizer tray 200 or deep tray 300 and the base wall 204, 304 at an adjacent tray 200, 300. Geometry of the openings 376 through the base wall 304 may correspond substantially to respective tabs along the transverse axis 106.

Figure 20:
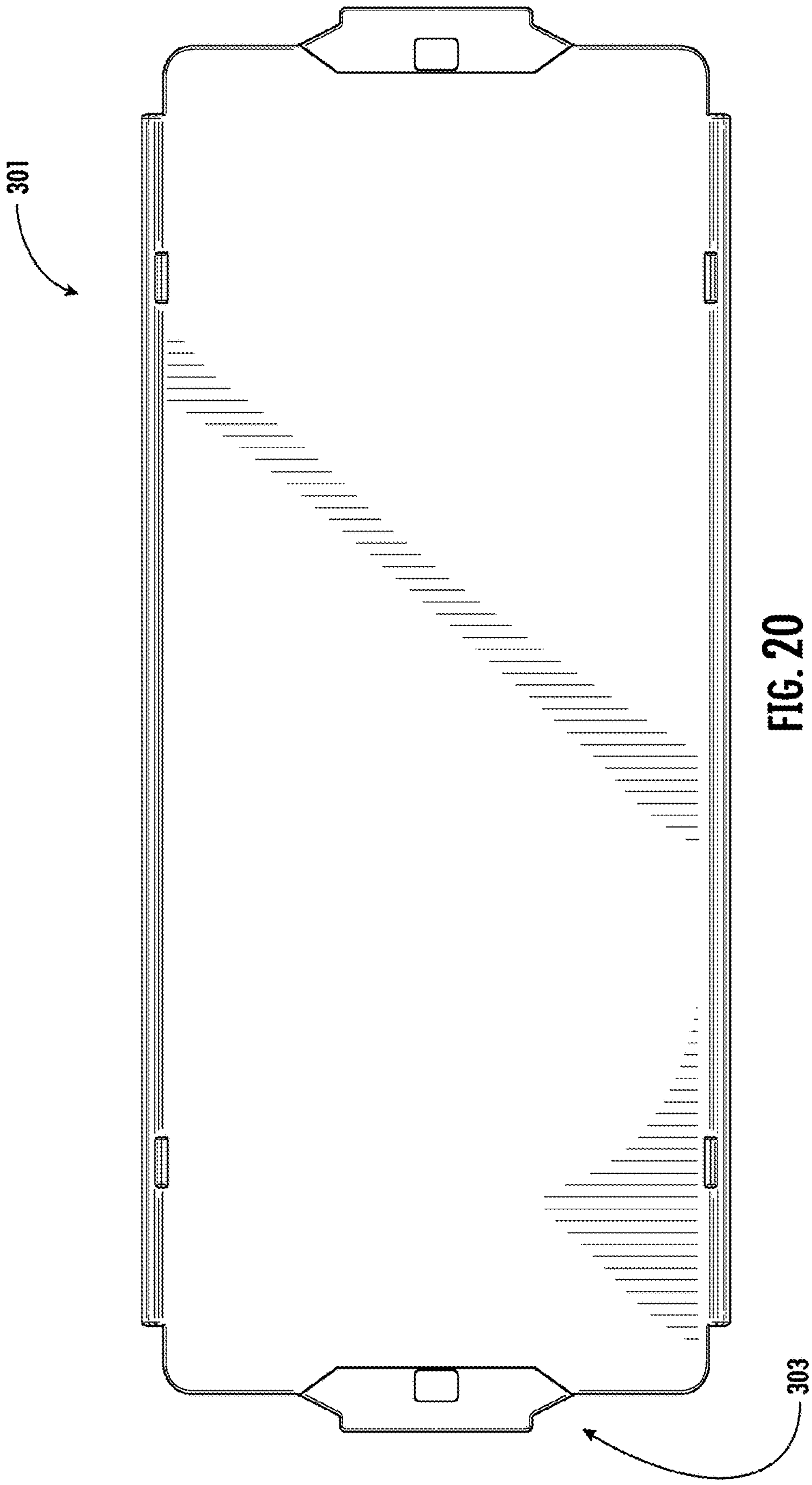
FIG. 20 is a top-down view of a cover for a deep tray in accordance with embodiments of the present disclosure.

Referring now to FIG. 20, an exemplary embodiment of a cover 301 for the deep tray 300 is provided. The cover 301 may include a breakaway section 303 at one or both of the first end 116 or the second end 118. In certain embodiments, the breakaway section 303 is positioned corresponding to the fiber retention post 320 when the cover 301 is installed on top of the deep tray 300. The breakaway section 303 may be configured as a selectively detachable and attachable portion separable from a main portion 305 of the cover 301. The main portion 305 forms a surface extending along the longitudinal axis and the lateral axis, such as to allow the main portion 305 to couple or position at the edge 368 of the deep tray 300.

Figure 21:
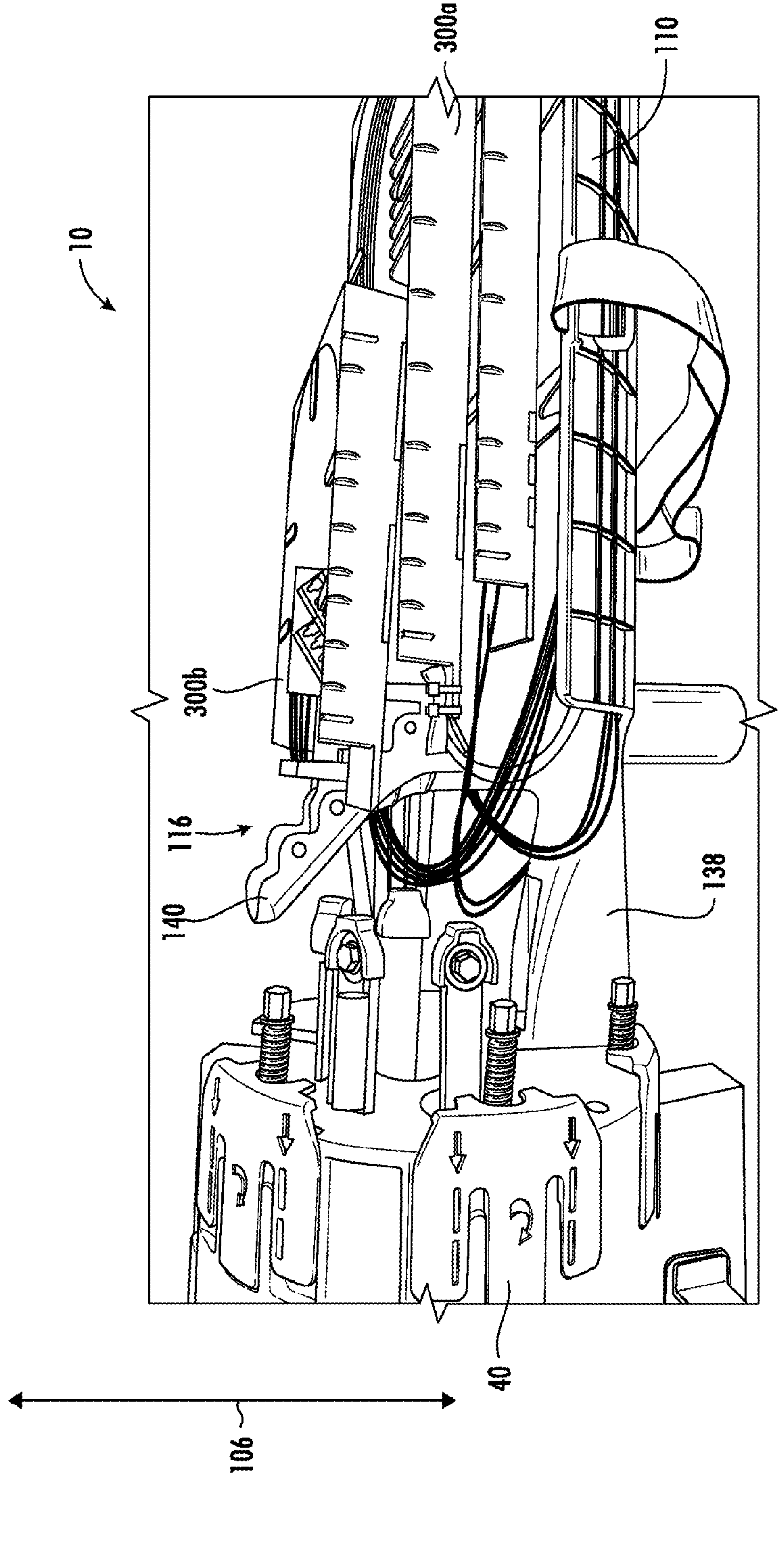
FIG. 21 is a side view of a portion of a closure including embodiments of a deep tray in accordance with embodiments of the present disclosure.
Figure 22:
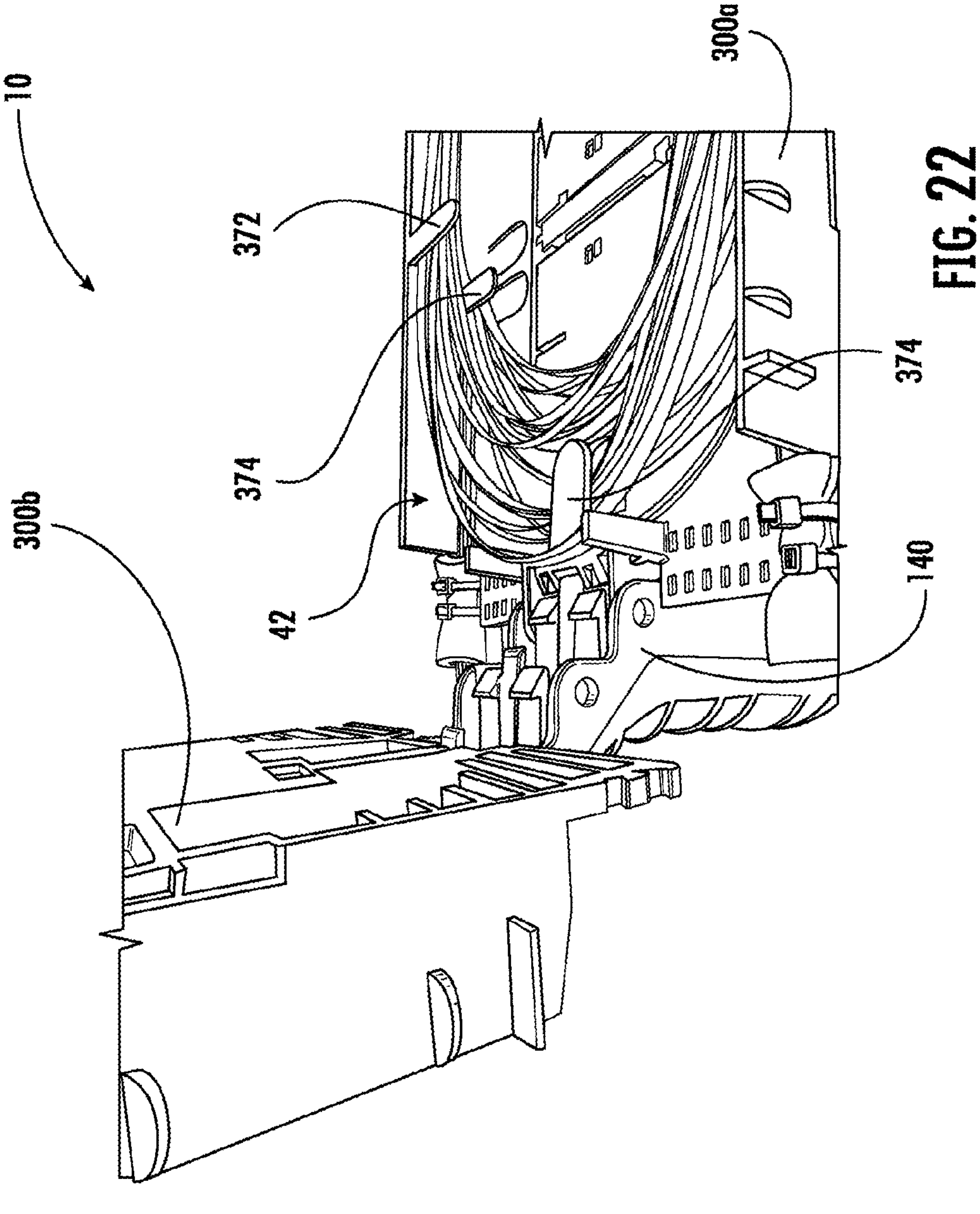
FIG. 22 is a side view of a portion of a closure including embodiments of a deep tray in accordance with embodiments of the present disclosure.

Referring now to FIGS. 21-22, embodiments of a closure 10 including embodiments of the deep ray 300 are provided. The closure 10 is configured substantially similarly as depicted and described with regard to the closure 10 in FIGS. 1-8. In FIGS. 21-22, the closure 10 includes a plurality of deep trays, depicted as a first deep tray **300*a* and a second deep tray 300*b*, in accordance with embodiments described with regard to FIGS. 15-20. The first deep tray 300*a* may be configured substantially as described with regard to the embodiment depicted in FIG. 16. The second deep tray 300*b* may be configured substantially similarly as described with regard to the embodiment depicted in FIG. 18. Walls 304, 306, 308 at deep tray 300*b* may extend along the longitudinal axis 102 less than corresponding walls at deep tray 300*a*. Deep tray 300*b* may form a top-most tray along the transverse axis 106 positioned atop one or more of deep tray 300*a***.

Figure 23:
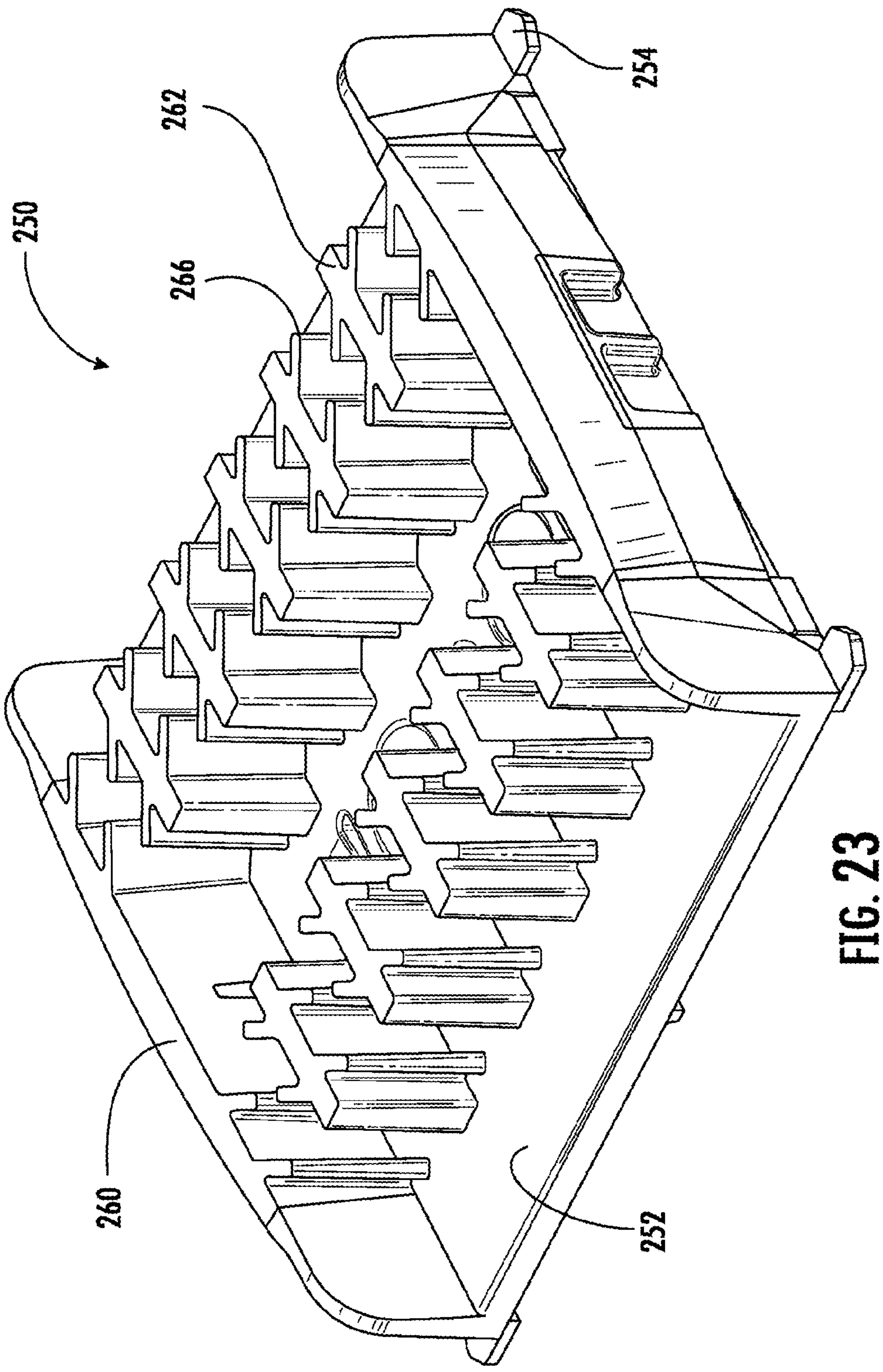
FIG. 23 is a perspective view illustrating a module mounting location in accordance with embodiments of the present disclosure.
Figure 24:
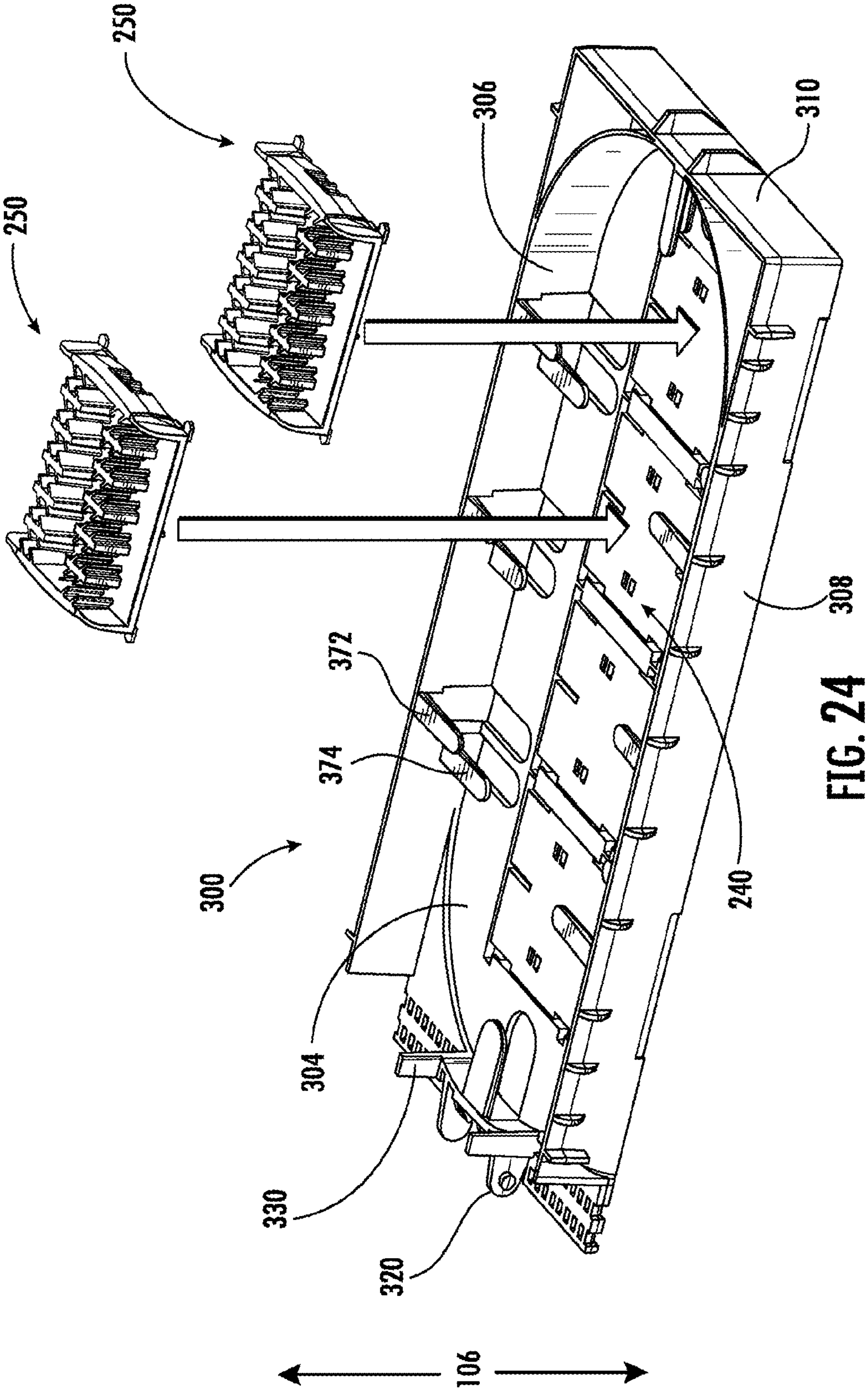
FIG. 24 is a perspective view illustrating a method for installing a module mounting location to a deep tray in accordance with embodiments of the present disclosure.

FIGS. 23-24 provide perspective views of a splice module 250, such as described regarding FIGS. 9-11, and a method for insertion to the deep tray 300. The splice module 250 may insert along the transverse axis 106 into mounting locations 240 at the deep tray 300, such as described regarding the organizing tray 200.

Figure 25:
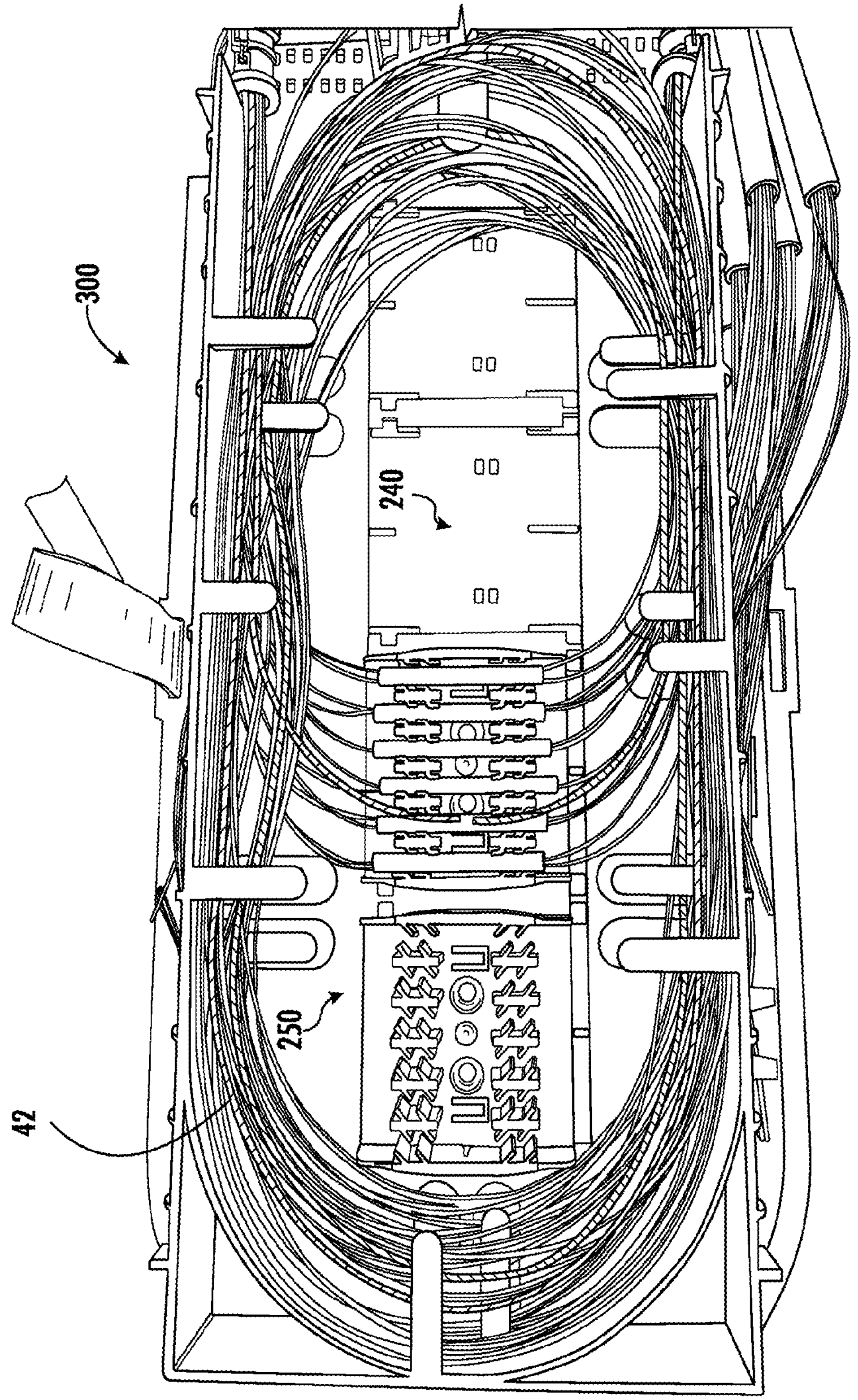
FIG. 25 is a top-down view of an embodiment of a deep tray including a module mounting location in accordance with embodiments of the present disclosure.
Figure 26:
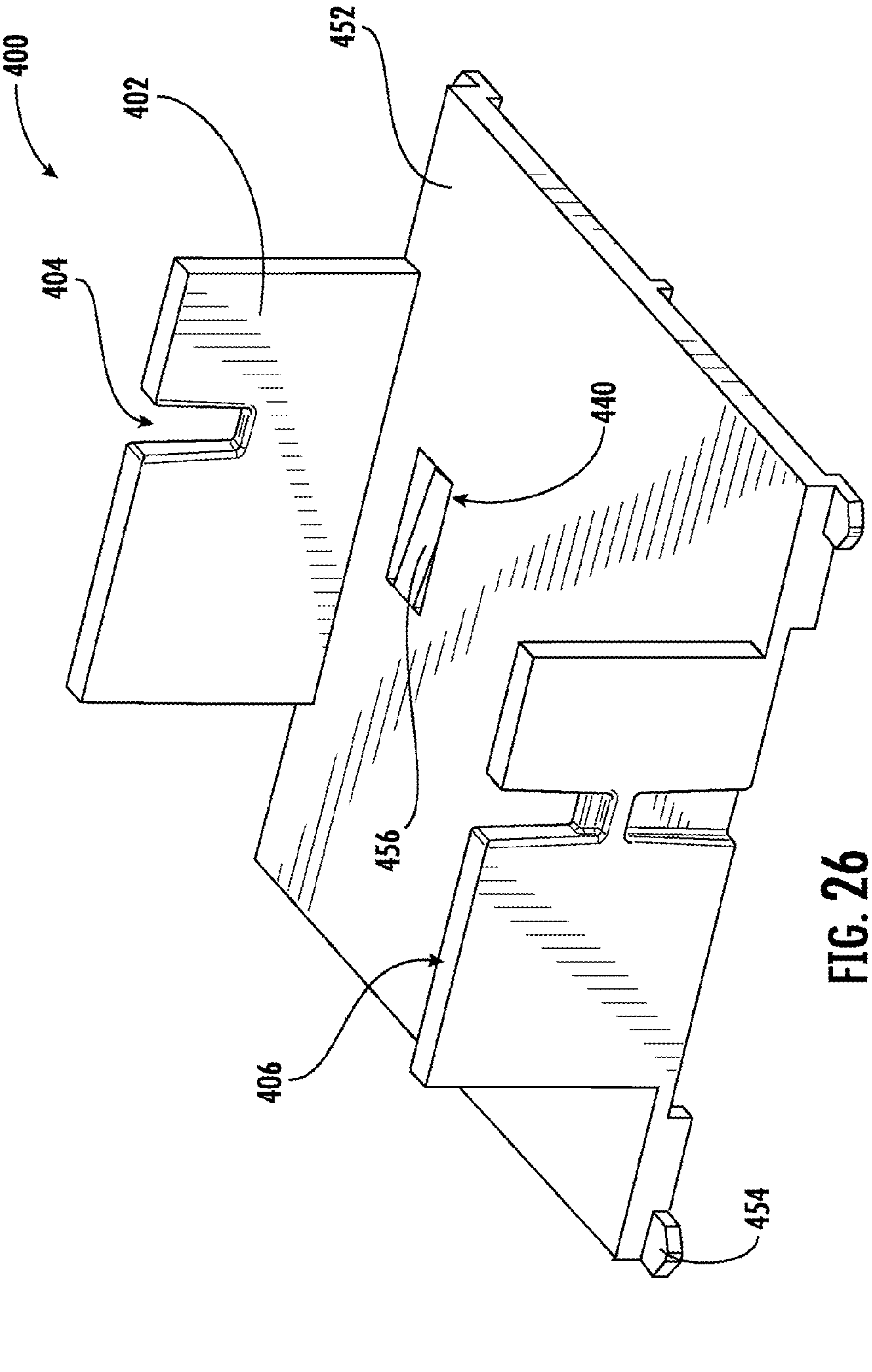
FIG. 26 is a perspective view of a portion of an adapter module in accordance with embodiments of the present disclosure.

FIG. 25 depicts an exemplary embodiment of the closure 10 including the deep tray 300 and the splice module 250. Cables 42 are routed and organized using the lower and upper retention tabs 372, 374. Cables 42 are spliced together at splice sleeves retained at the splice module 250. Deep tray 300 allows for two-tiered separation of slack storage loops of cable 42 when routing and retaining cable 42 and transmission elements in the interior 314.

Figure 36:
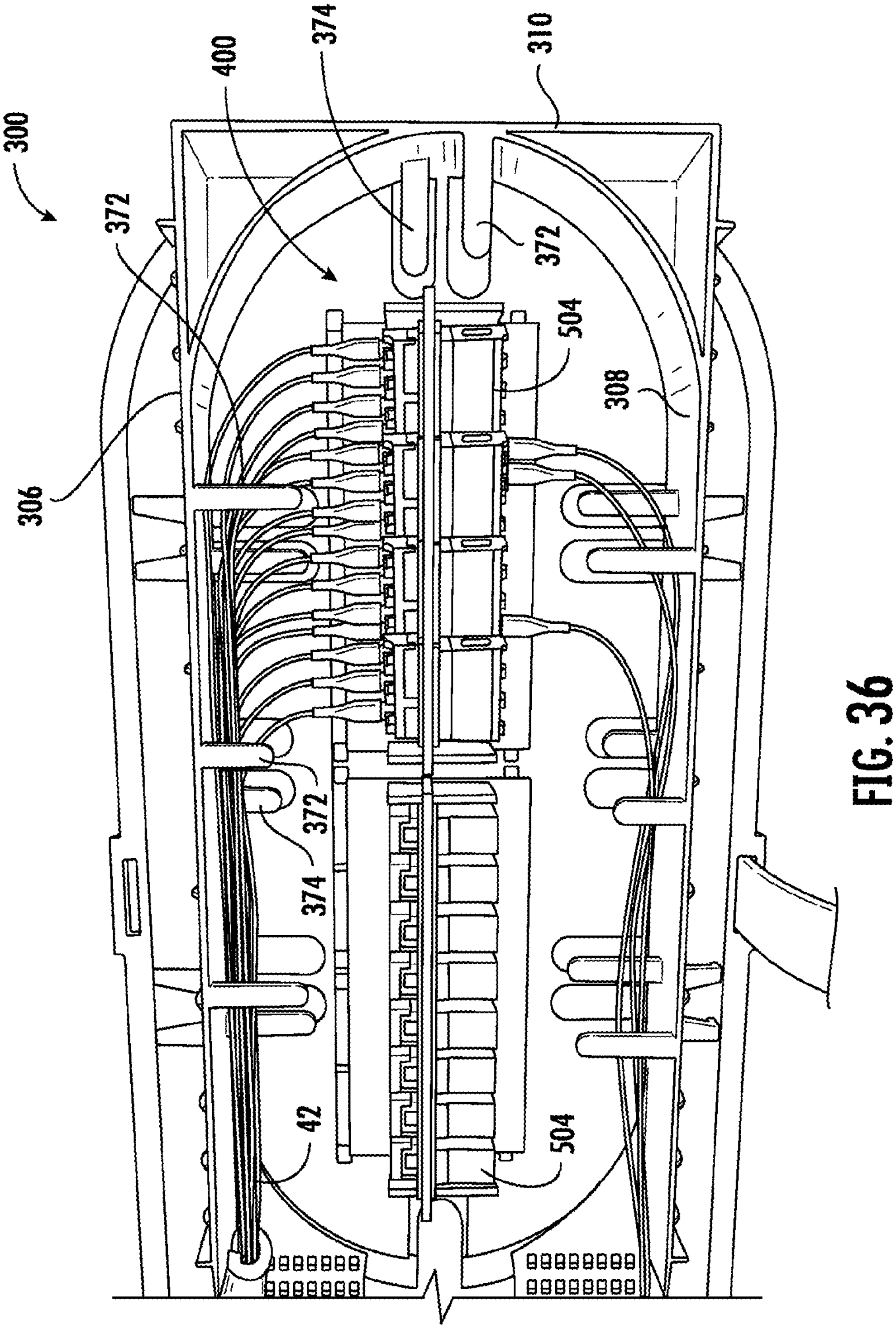
FIG. 36 is a top-down view of a deep tray including an adapter module in accordance with embodiments of the present disclosure.

FIGS. 26-35 depict an adapter module 400 configured to hold or retain connectors at the closure 10, such as depicted in FIG. 36. The adapter module 400 includes a base panel 452 and a plurality of legs 454 extending from the base panel 452. The legs 454 may extend from and at least partially define a periphery of the base panel 452, and may further be disposed at corners of the base panel 452. Each leg 454 may be inserted into one of the leg slots 242 of a mounting location 240, such as described above. The adapter module 400 may include one or more cantilevered arms 456 extending from the base panel 452, such as below the base panel 452 as shown. Each cantilevered arm 456 may include a tab 458 at a distal end thereof. To removably connect the adapter module 400 to the deep tray 300 at a module mounting location 440, one or more cantilevered arms 456, such as the tab 458 thereof, may be inserted in one of a plurality of positioning slots 244 of a module mounting location 240.

The adapter module 400 includes adapter walls 402 extending along the transverse axis 106. The adapter wall 402 may particularly extend from a periphery of the base panel 452 between a pair of legs 454. The adapter wall 402 includes a slot 404 extending from an upper peripheral edge 406 and along the transverse axis 106. The adapter module 400 may include a pair of adapter walls 402 each having slot 404 positioned across from one another along the lateral axis 104. The slot 404 is configured to receive an adapter insert 410 (FIGS. 28-31).

Figure 30:
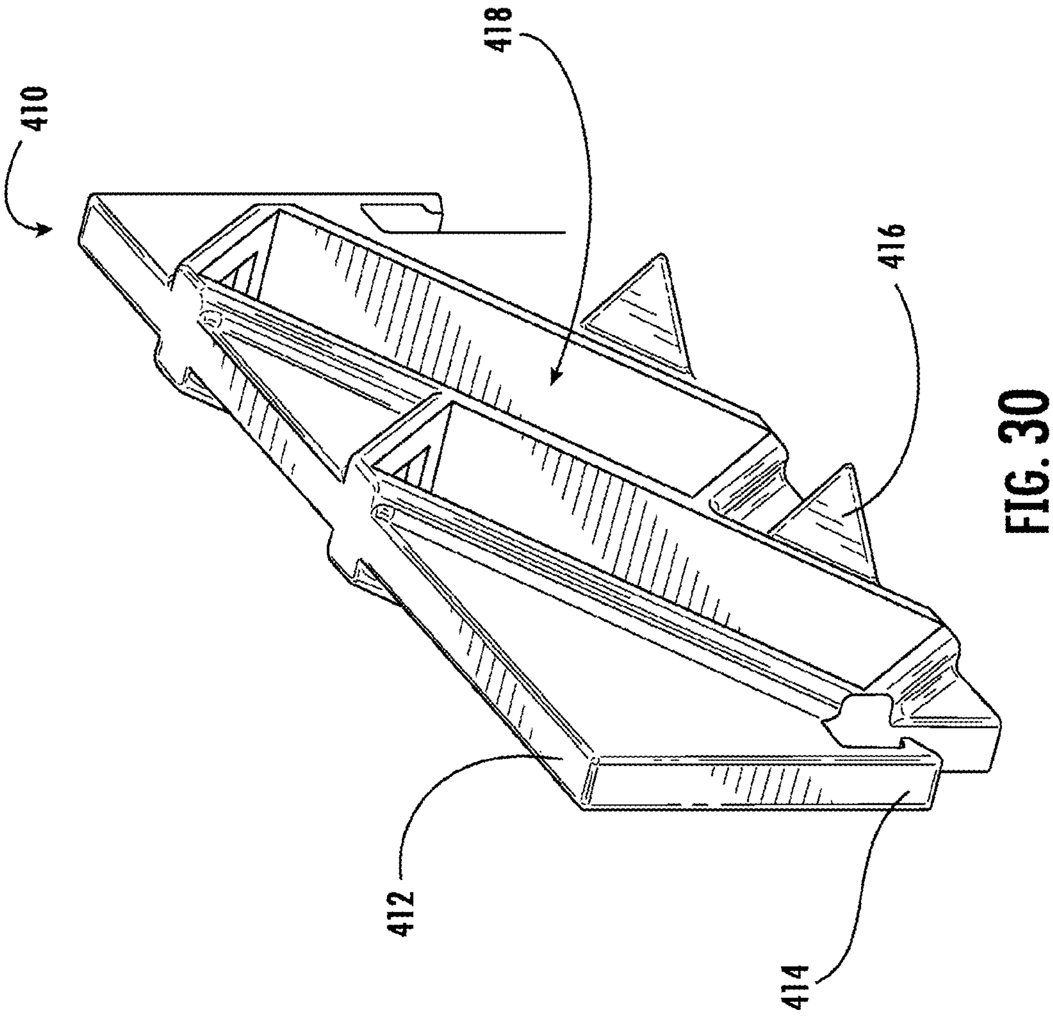
FIG. 30 is a perspective view of an adapter insert in accordance with embodiments of the present disclosure.
Figure 31:
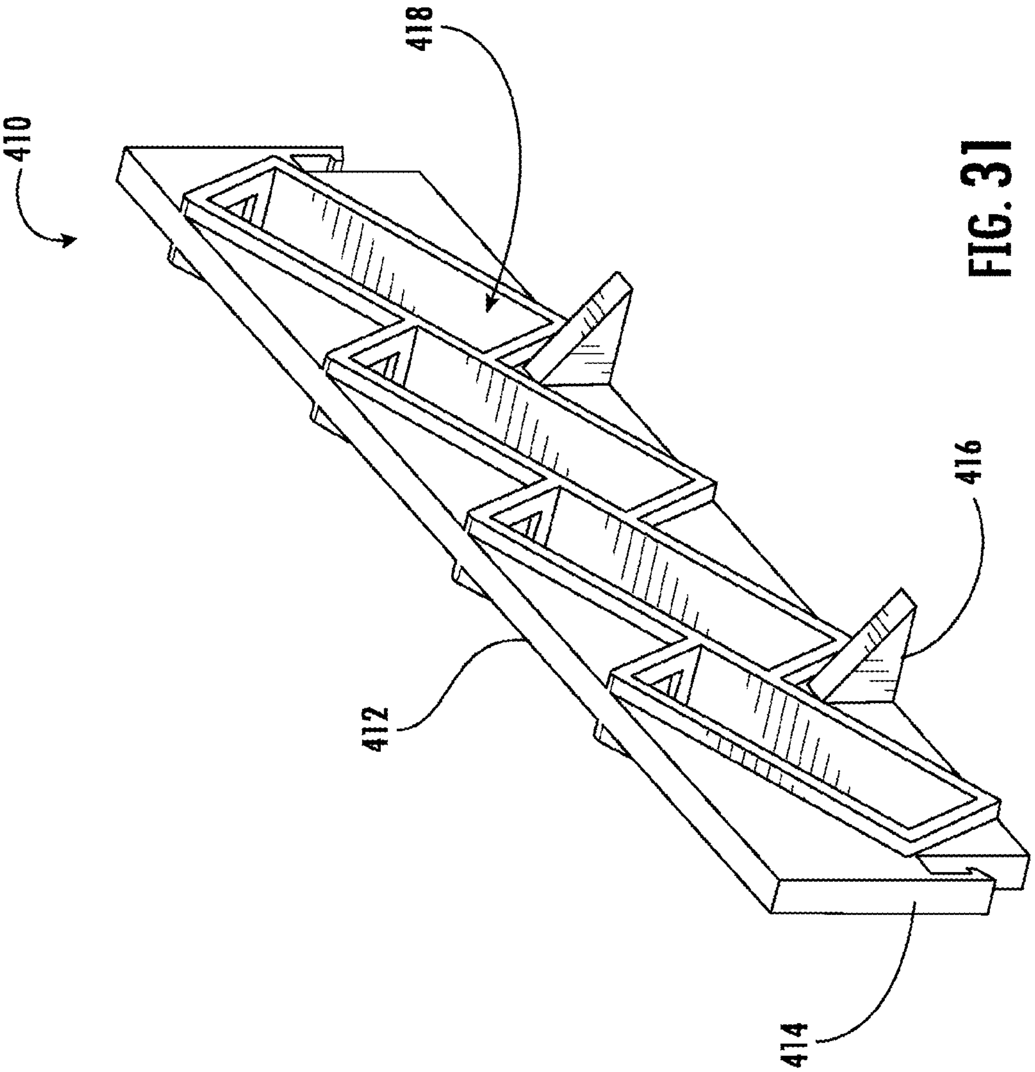
FIG. 31 is a perspective view of an adapter insert in accordance with embodiments of the present disclosure.
Figure 32:
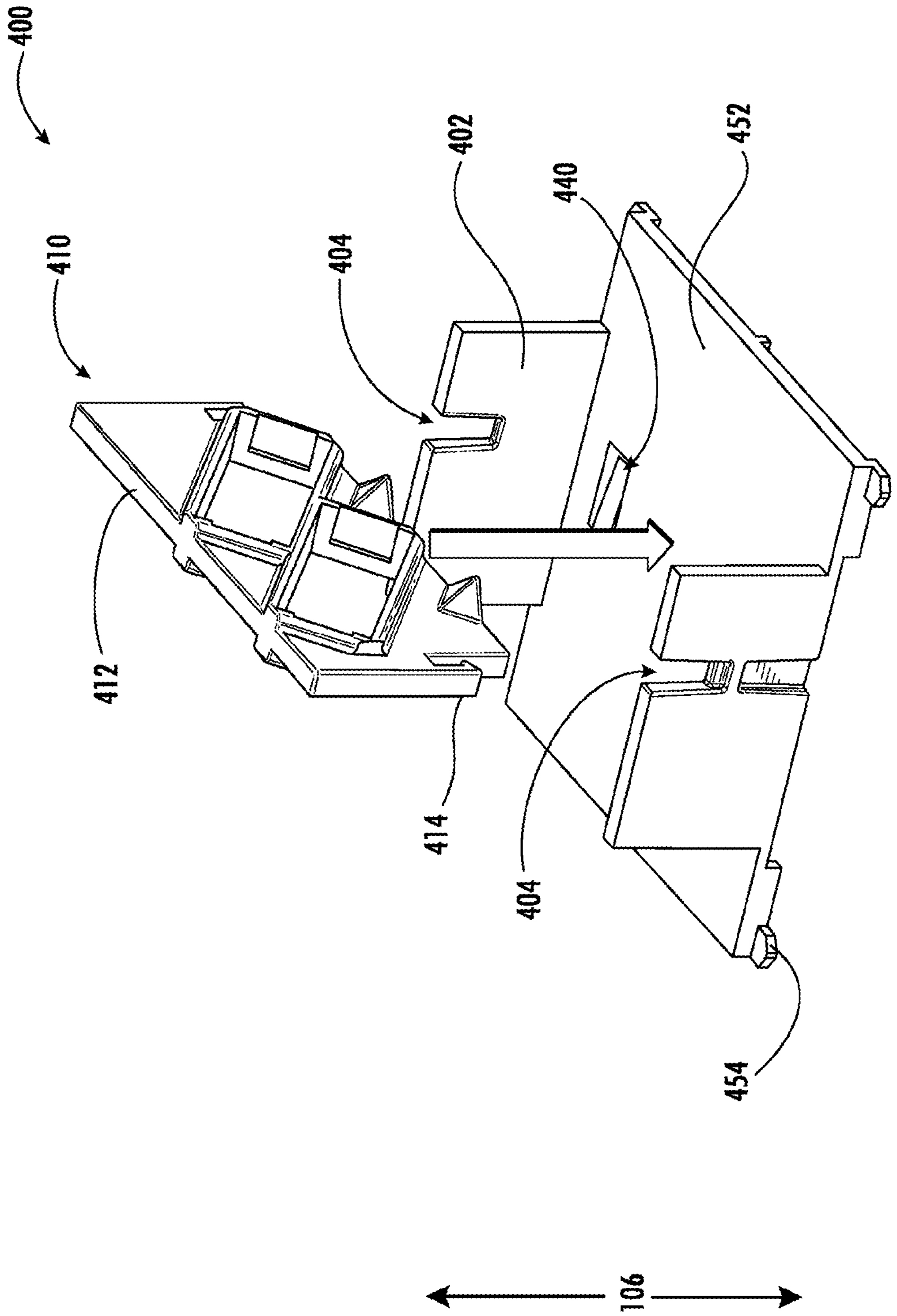
FIG. 32 is a perspective view of a method for installing an adapter insert to the adapter module in accordance with embodiments of the present disclosure.
Figure 33:
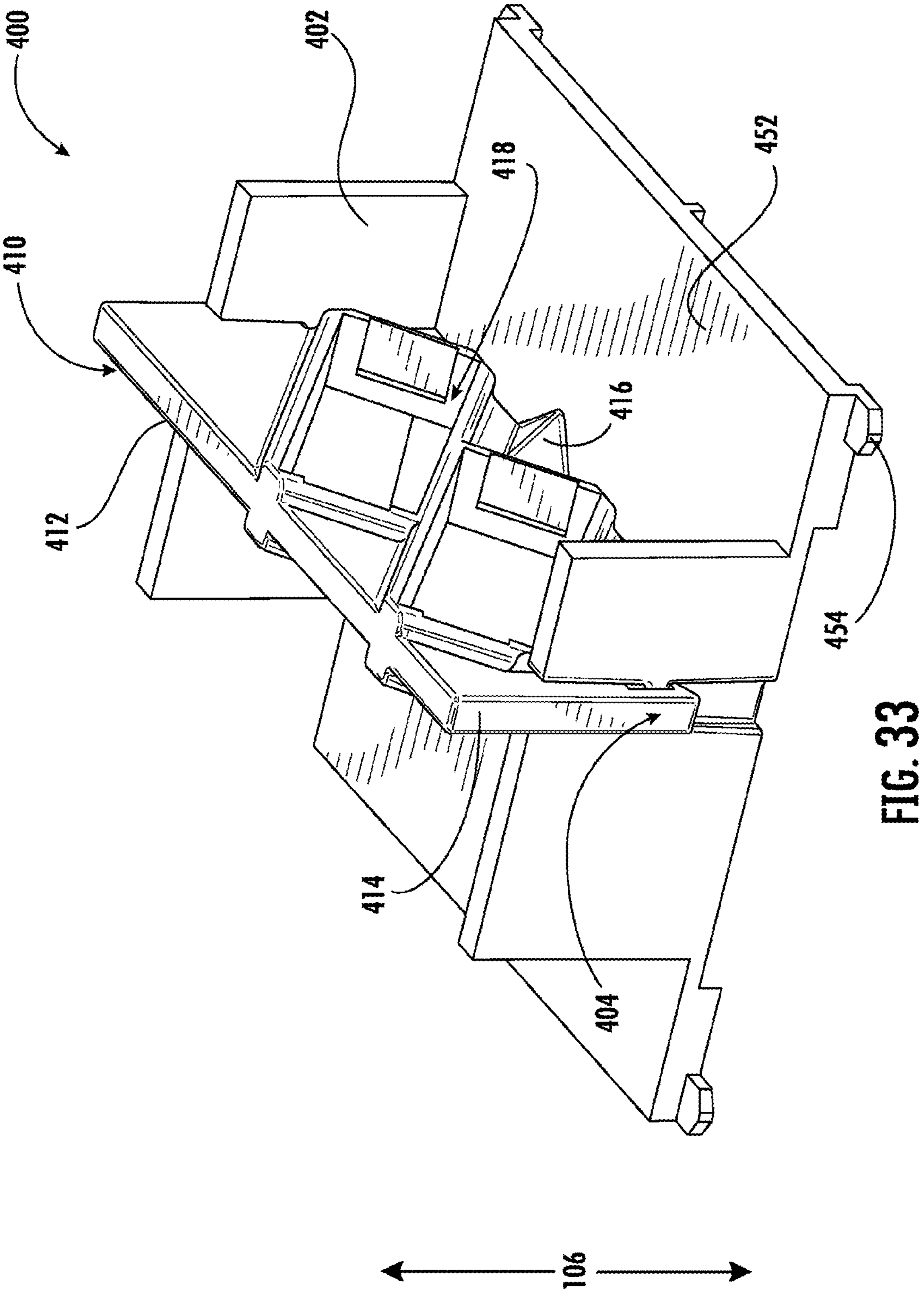
FIG. 33 is a perspective view of an adapter module in accordance with embodiments of the present disclosure.

Referring to FIGS. 28-32, the adapter insert 410 includes a longitudinally extending wall 412 disposable within the slots 404 at the adapter walls 402. In particular embodiments, the wall 412 is extending along the longitudinal axis 102 to the longitudinally separated slots 404 at the adapter module 400. The wall 412 may include a groove, hold, or latch 414 at which the wall 412 is configured to directly contact portions of the adapter wall 402 at which the slot 404 is formed. The latch 414 may include a step at ends of the wall 412, such as to allow a portion of the wall 412 to extend through the slot 404 and another portion of the wall 412 to extend to the base panel 452, such as depicted in FIGS. 32-35. The perspective view of the exemplary embodiment of the adapter module 400 in FIG. 32 depicted assembly of the wall 412 along the transverse axis 106 into the slot 404 at the adapter wall 402. The base panel 452 of the adapter module 400 may be inserted substantially along the transverse axis 106 into mounting locations 240, such as depicted and described with regard to FIG. 24.

The adapter insert 410 may further include a support member 416 extending from the wall 412 to contact the base panel 452. The support member 416 may extend perpendicular or oblique to an extension of the wall 412. For instance, the wall 412 may extend along the longitudinal axis 102, such as depicted in FIG. 36. The support member 416 may extend along the lateral axis 104, or an angle between the lateral axis 104 and the longitudinal axis 102, from the wall 412.

Figure 28:
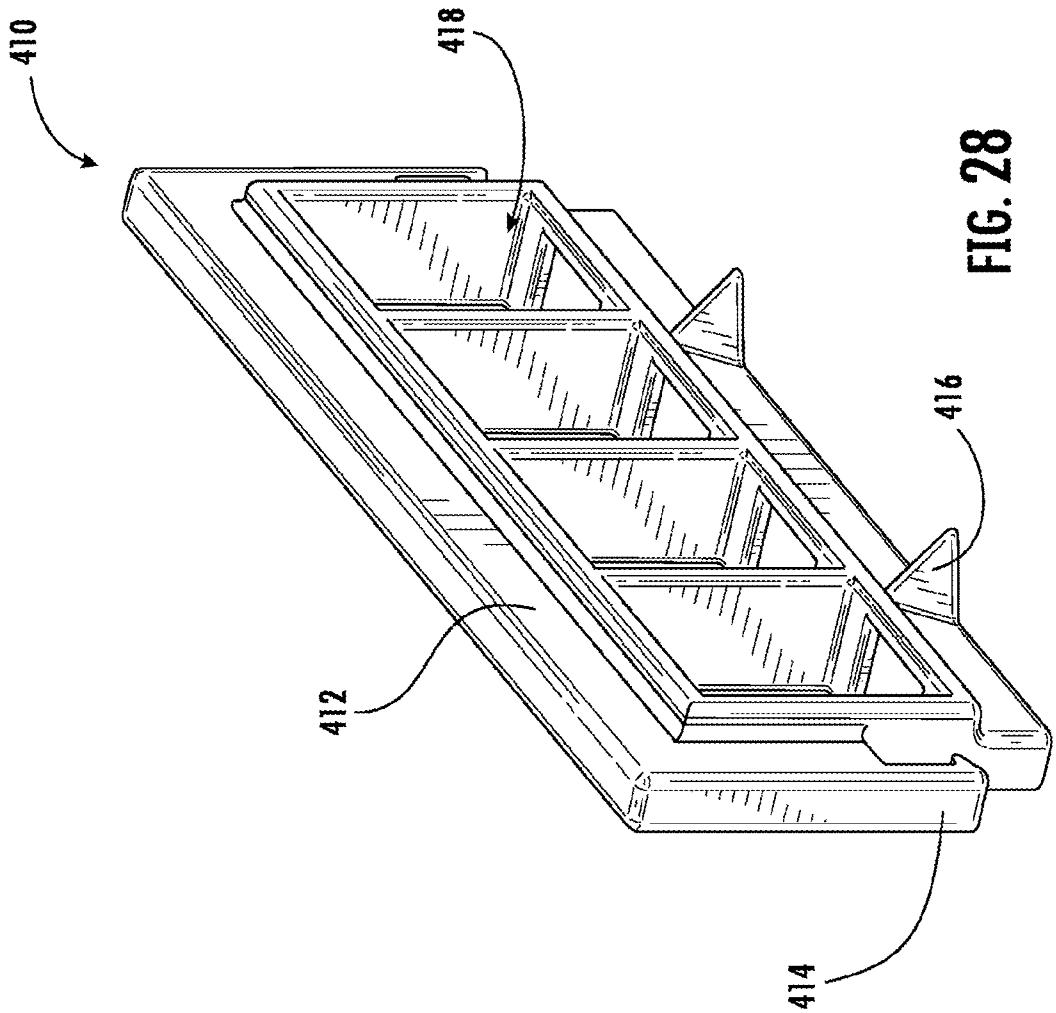
FIG. 28 is a perspective view of an adapter insert in accordance with embodiments of the present disclosure.
Figure 29:
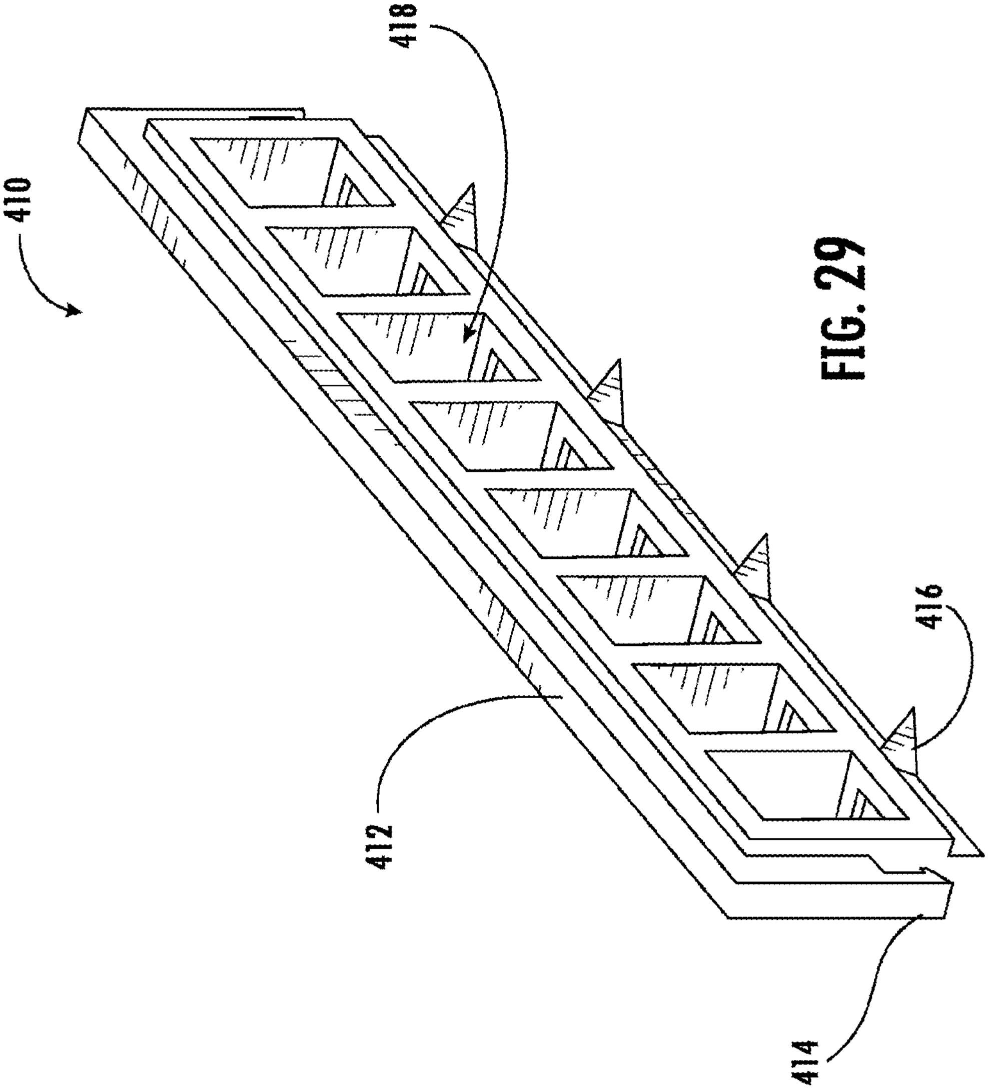
FIG. 29 is a perspective view of an adapter insert in accordance with embodiments of the present disclosure.

In various embodiments, such as depicted in FIGS. 28-31, the wall 412 forms an opening 418 for receiving a connector 504. The wall 412 may form the opening 418 as a rectangular cross-sectional area through the wall 412. It should be appreciated that the wall 412 may form the opening 418 with any appropriate cross-sectional geometry, including other polygonal cross-sections, circular, ovular, or variable cross-sectional areas. The opening 418 may be formed as a plurality of discrete openings each configured to receive a corresponding connector therethrough. The opening 418 may be configured to receive SC connectors, LC connectors, simplex configurations, duplex configurations, quad configurations, SC-SC connector interfaces, LC-LC connector interfaces, or SC-LC connector interfaces, or any other appropriate type of fiber optic connector, or combinations thereof. The opening 418 may include a major axis extending along the transverse axis 106, such as depicted in FIGS. 28-29. A minor axis of the opening 418 may extend along the longitudinal axis 102. The opening 418 may include a major axis and minor axis tilted or rotated relative to the transverse axis, such as depicted in FIGS. 30-31.

Figure 27:
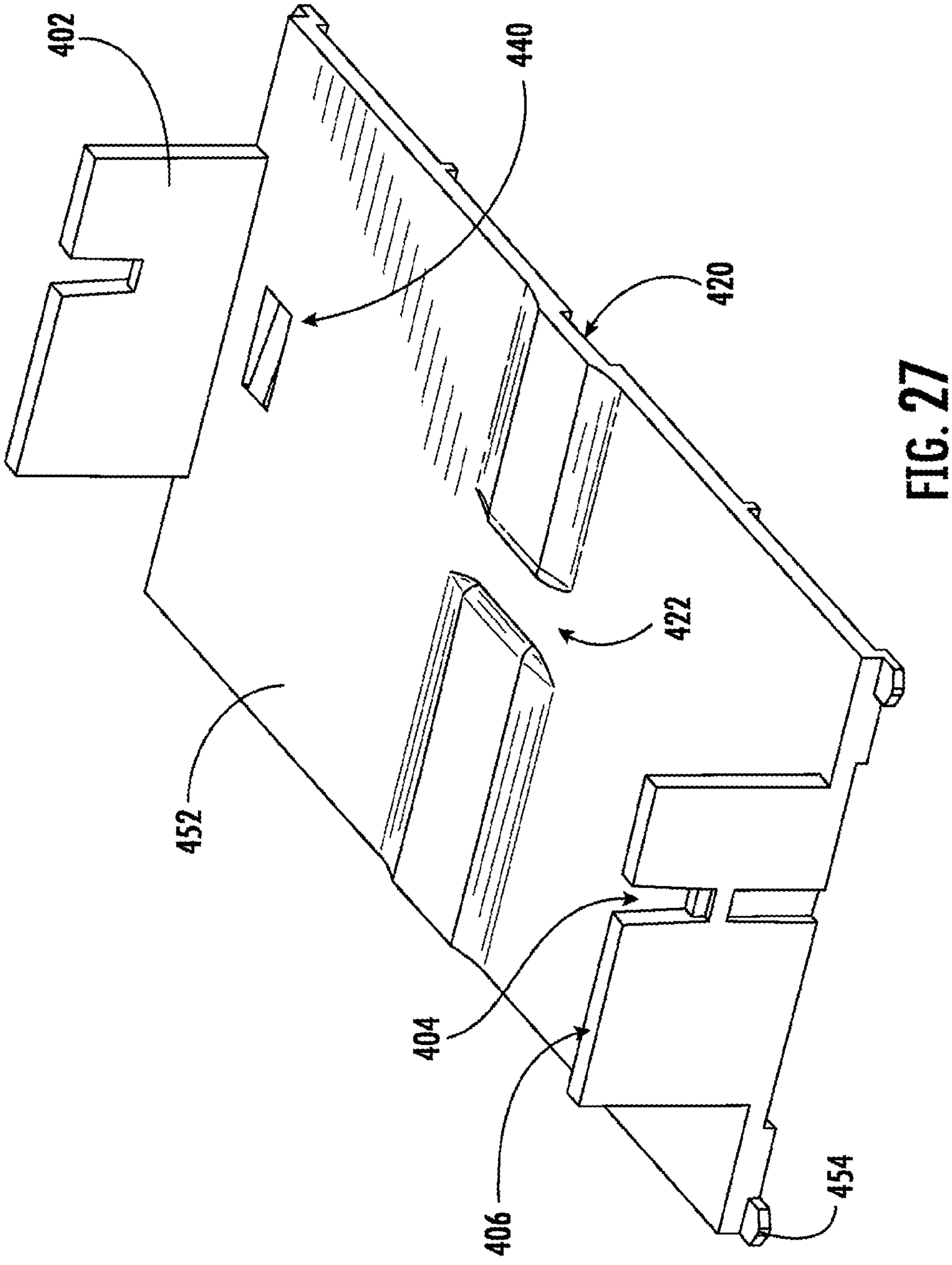
FIG. 27 is a perspective view of a portion of an adapter module in accordance with embodiments of the present disclosure.
Figure 34:
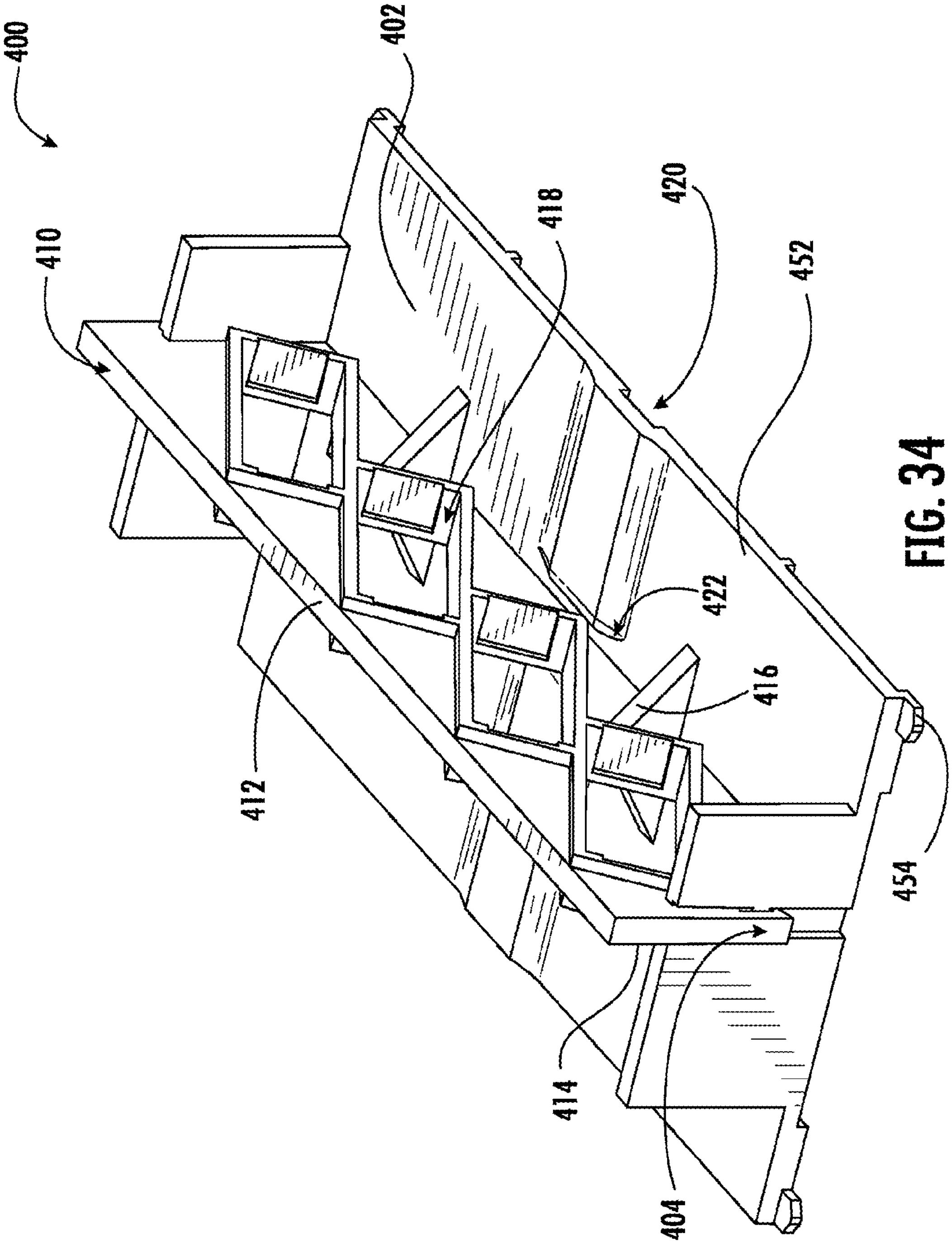
FIG. 34 is a perspective view of an adapter module in accordance with embodiments of the present disclosure.
Figure 35:
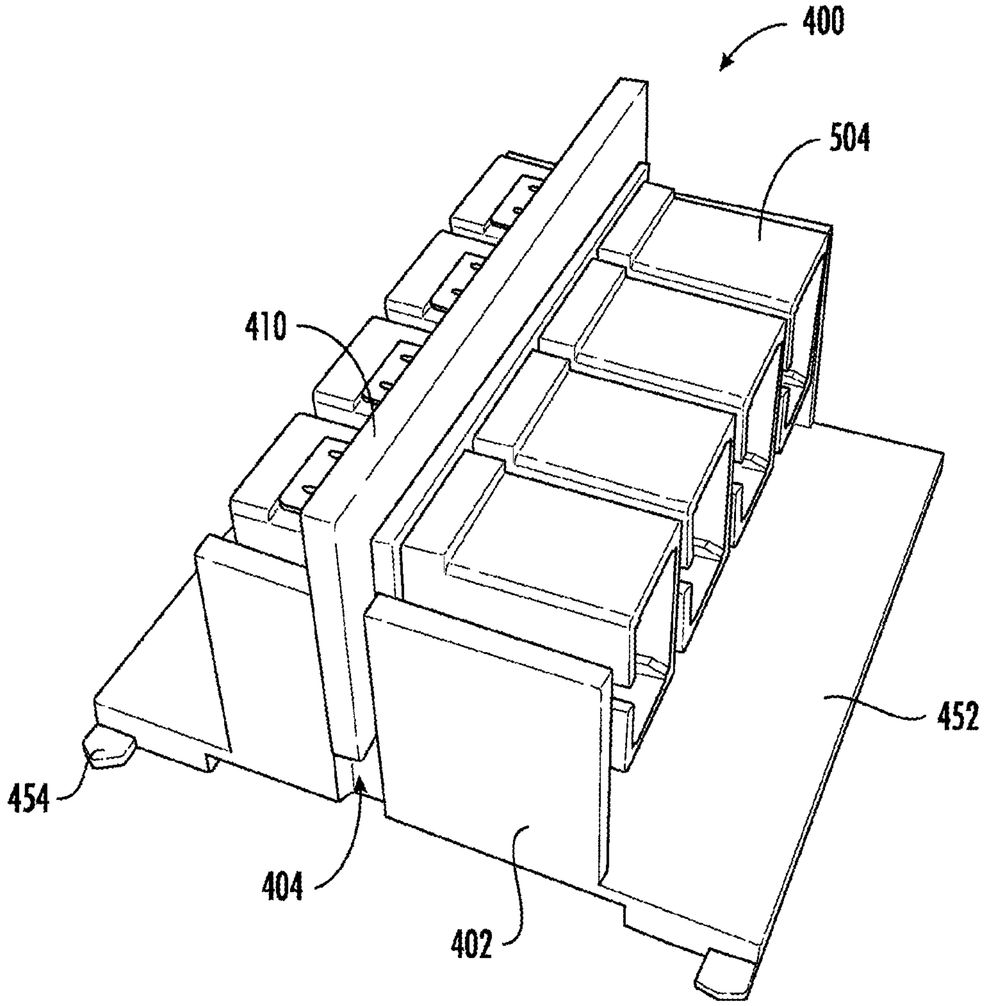
FIG. 35 is a perspective view of an adapter module including fiber optic connectors in accordance with embodiments of the present disclosure.

In certain embodiments, such as depicted in FIG. 27 and FIG. 34, the adapter module 400 may form a double-wide structure. The double-wide adapter module 400 is formed substantially similarly as a single-wide adapter module 400. The double-wide structure may further include a raised channel 420 formed at the base panel 452 corresponding to a channel 246 formed at the base wall 304 of the deep tray 300. A flat portion 422 may extend across the channel 420, such as to allow the wall 412 to extend flat along the base panel 452 between slots 404.

Figure 37:
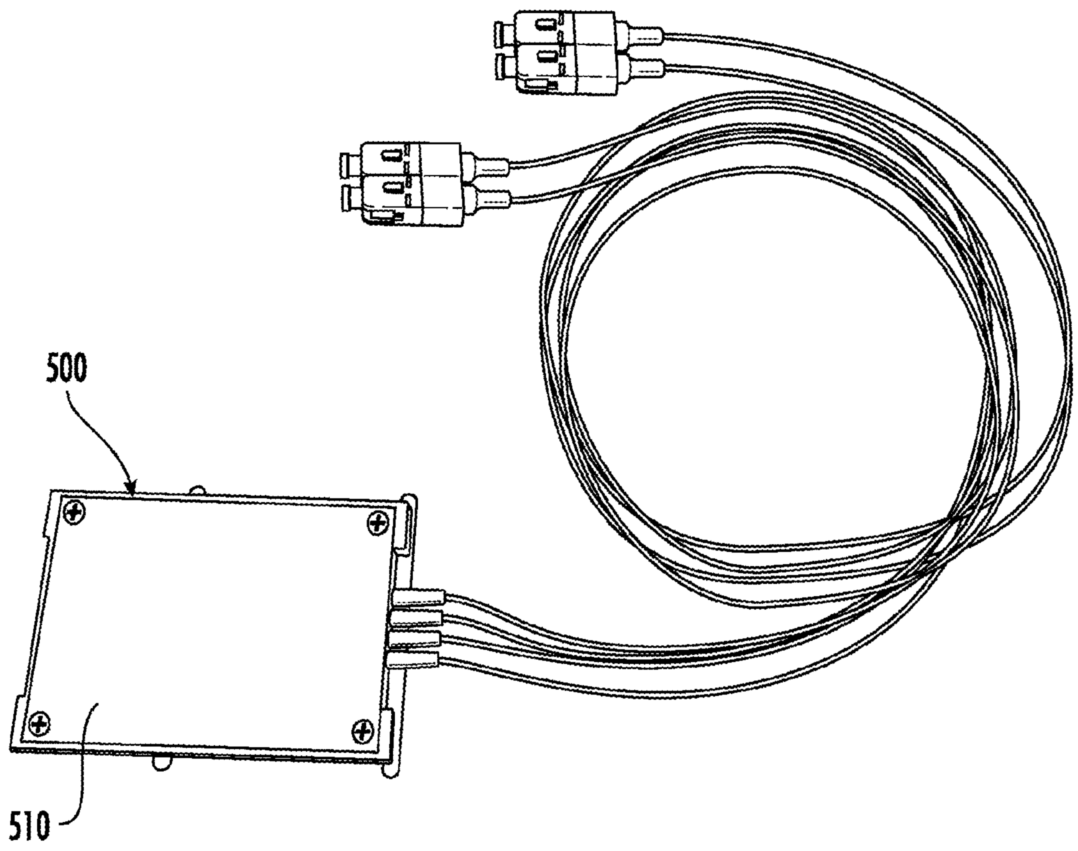
FIG. 37 is a perspective view of a tray adapter in accordance with embodiments of the present disclosure.

Referring now to FIG. 37, an embodiment of an optical cassette 500 positioned in a tray adapter 510 is provided. The tray adapter 510 may be configured substantially similarly as the base 252 or base panel 452 described herein. The tray adapter 510 may include holes, slots, or openings through which tie wraps or other retention devices may be utilized to secure or fix the optical cassette 500 to the tray adapter 510. The tray adapter 510 may fix or secure to the deep tray 300 such as described regarding the base 252 or base panel 452 described herein.

Figure 38:
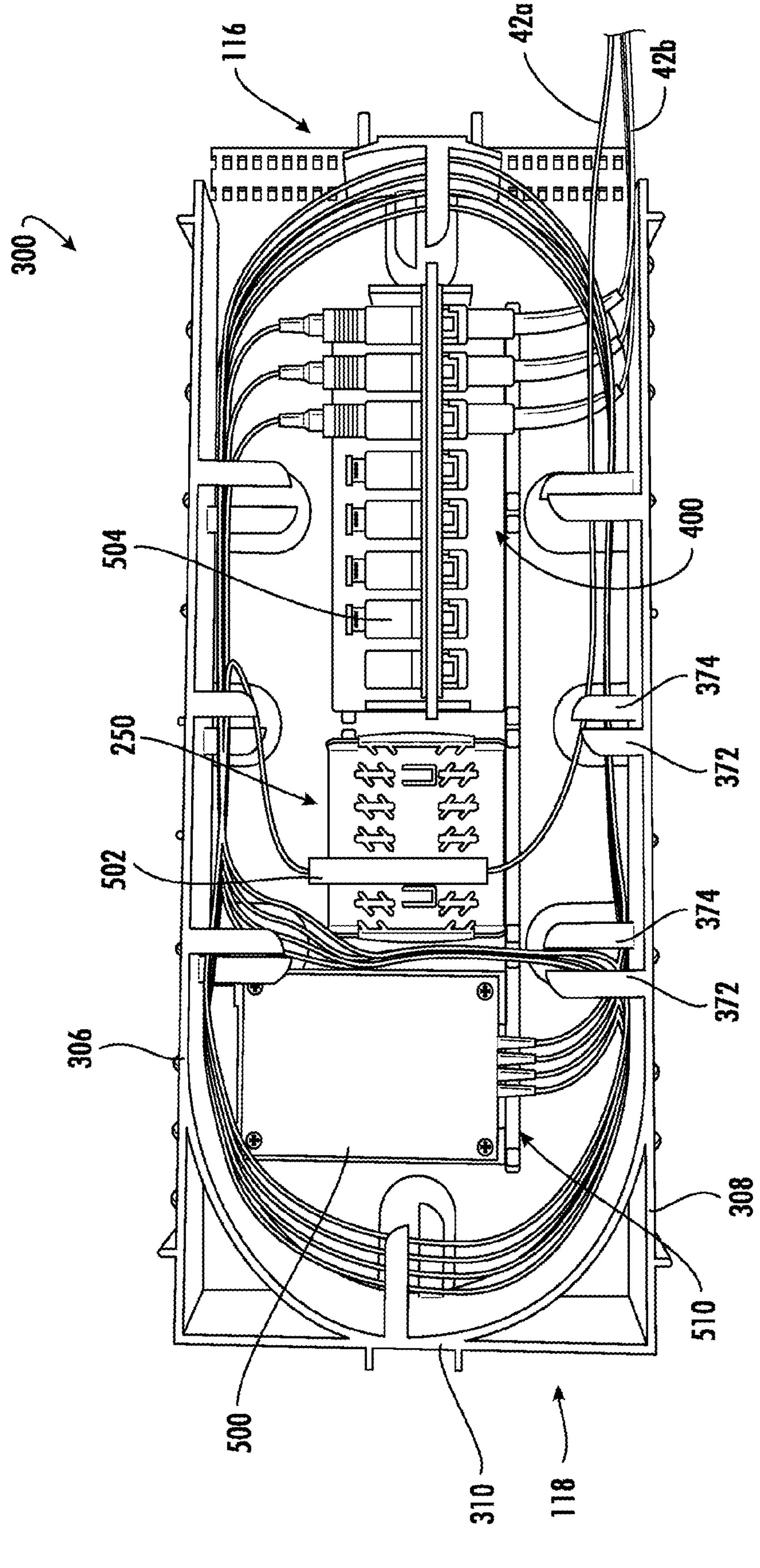
FIG. 38 is a perspective view of deep tray including an adapter module, a tray module, and a splice module in accordance with embodiments of the present disclosure.

FIG. 38 provides a top-down perspective view of an exemplary embodiment of the deep tray 300. The embodiment depicted includes the optical cassette 500 secured in the tray adapter 510, a splice sleeve 502 secured to the splice module 250, and a plurality of fiber optic connectors 504 secured to the adapter module 400. The tray adapter 510, the splice module 250, and the adapter module 400 are each secured or fixed to the deep tray 300 such as described herein. The tray adapter 510 may particularly be secured proximate to the closed second end 118 of the deep tray, or generally distal to the open first end 116. Cables 42, including desired cable slack loops, are routed through the open first end 116 and organized via the upper and lower retention tabs 372, 374.

The deep tray 300 may allow for an input fiber 42*a* to ingress through the open first end 116 and route to the splice module 250. The input fiber 42*a* is spliced at the splice module 250, such as at the splice sleeve 502. The output fiber is routed to the optical splitter or optical cassette 500 positioned at the tray adapter 510. A plurality of output fibers 42*b* is routed from the cassette 500 to the fiber optic connectors 504 at the adapter module 400. Output cables are egressed from the connectors at the adapter module 400 through the open first end 116 of the deep tray 300.

Further aspects of the invention are provided by one or more of the following embodiments:

1. A fiber optic closure including a base insertable at least partially into the interior of the closure; a basket extending along a longitudinal axis between a first end and a second end, wherein the first end forms an open end such that one or more cables extends into the interior of the closure along the longitudinal axis, and the second end forms a closed end; a bracket assembly extending along a transverse axis from the basket, the bracket assembly including a plurality of hinge assemblies along the transverse axis; a deep tray rotatably and removably connectable to the bracket assembly between the hinge assemblies, the deep tray extending along the longitudinal axis between the first end and the second end and extending along a lateral axis between a first sidewall and a second sidewall, wherein a plurality of retention tabs includes an upper retention tab extending along the lateral axis from one or more of the first sidewall or the second sidewall, and a lower retention tab extending from the first sidewall or the second sidewall proximate along the transverse axis to a base panel relative to the upper retention tab; and a connector shaft extending from the first end along the longitudinal axis, the connector shaft connecting the organizing system and the base together.

2. The fiber optic closure of any one or more clauses herein, the deep tray including a fiber optic organizing system of any one or more clauses herein.

3. A fiber optic closure including a base insertable at least partially into the interior of the closure; a basket extending along a longitudinal axis between a first end and a second end, wherein the first end forms an open end such that one or more cables extends into the interior of the closure along the longitudinal axis, and the second end forms a closed end; a bracket assembly extending along a transverse axis from the basket, the bracket assembly including a plurality of hinge assemblies along the transverse axis; an organizing system rotatably and removably connectable to the bracket assembly between the hinge assemblies, the organizing system including a main body, the main body including a plurality of walls separated along the longitudinal axis between a front and a rear and along the lateral axis, the main body including a base panel connecting the plurality of walls; an upper retention tab extending along the lateral axis or the longitudinal axis from one or more of the plurality of walls; and a lower retention tab extending from the plurality of walls and positioned proximate along the transverse axis to the base panel relative to the upper retention tab; and a connector shaft extending from the first end along the longitudinal axis, the connector shaft connecting the organizing system and the base together.

4. A fiber optic closure including a base insertable at least partially into the interior of the closure; a basket extending along a longitudinal axis between a first end and a second end, wherein the first end forms an open end such that one or more cables extends into the interior of the closure along the longitudinal axis, and the second end forms a closed end; a bracket assembly extending along a transverse axis from the basket, the bracket assembly including a plurality of hinge assemblies along the transverse axis; an organizing system rotatably and removably connectable to the bracket assembly between the hinge assemblies, the organizing system including a main body, the main body including a plurality of walls separated along the longitudinal axis between a front and a rear and along the lateral axis, the main body including a base panel connecting the plurality of walls, the organizing system including an adapter module including an adapter wall extending along the transverse axis, wherein a slot is extending along the transverse axis from an upper peripheral edge of the adapter wall, and wherein an adapter insert is extending along a base panel and disposable within slots at adapter walls; and a connector shaft extending from the first end along the longitudinal axis, the connector shaft connecting the organizing system and the base together.

5. A fiber optic closure including a base insertable at least partially into the interior of the closure; a basket extending along a longitudinal axis between a first end and a second end, wherein the first end forms an open end such that one or more cables extends into the interior of the closure along the longitudinal axis, and the second end forms a closed end; a bracket assembly extending along a transverse axis from the basket, the bracket assembly including a plurality of hinge assemblies along the transverse axis; an organizing system rotatably and removably connectable to the bracket assembly between the hinge assemblies, the organizing system including a main body, the main body including a plurality of walls separated along the longitudinal axis between a front and a rear and along the lateral axis, the main body including a base panel connecting the plurality of walls, the organizing system including an adapter module including a leg corresponding to a respective mount opening formed at the base panel, wherein the adapter module is receivable by the mount opening at the base panel, and wherein the adapter module comprises a laterally extending adapter wall, wherein the adapter wall forms a slot extending along the transverse axis configured to receive an adapter insert; and a connector shaft extending from the first end along the longitudinal axis, the connector shaft connecting the organizing system and the base together.

6. The fiber optic organizing system of any clause herein, wherein the adapter insert is extended along longitudinal axis and configured to be received at the slot formed at the adapter wall, the adapter insert forming an adapter wall opening through which a fiber optic connector is extendable.

7. A fiber optic closure including a base insertable at least partially into the interior of the closure; a basket extending along a longitudinal axis between a first end and a second end, wherein the first end forms an open end such that one or more cables extends into the interior of the closure along the longitudinal axis, and the second end forms a closed end; a bracket assembly extending along a transverse axis from the basket, the bracket assembly including a plurality of hinge assemblies along the transverse axis; an organizing system rotatably and removably connectable to the bracket assembly between the hinge assemblies, the organizing system including a main body, the main body including a plurality of walls separated along the longitudinal axis between a front and a rear and along the lateral axis, the main body including a base panel connecting the plurality of walls, wherein a plurality of mount openings is formed at the base panel, the organizing system including a splice module forming one or more module walls extending along the transverse axis and the lateral axis, wherein the plurality of mount openings is configured to receive the splice module and affix to the base panel; and a connector shaft extending from the first end along the longitudinal axis, the connector shaft connecting the organizing system and the base together.

8. The fiber optic organizing system of any one or more clauses herein, wherein the splice module including one or more partitions extending from the module wall along a direction between the lateral axis and the longitudinal axis.

9. The fiber optic organizing system of any one or more clauses herein, wherein the partitions are deformable to allow a splice sleeve to affix to the splice module between pairs of module walls.

10. The fiber optic organizing system of any one or more clauses herein, wherein the splice module retainer comprises a leg corresponding to a respective mount opening formed at the base panel.

11. The fiber optic organizing system of any one or more clauses herein, wherein the main body includes a plurality of walls separated along the longitudinal axis between a front and a rear and along the lateral axis, the main body including a base panel connecting the plurality of walls; an upper retention tab extending along the lateral axis or the longitudinal axis from one or more of the plurality of walls; and a lower retention tab extending from the plurality of walls and positioned proximate along the transverse axis to the base panel relative to the upper retention tab.

13. The fiber optic organizing system of any one or more clauses herein, wherein the upper retention tab is offset along the longitudinal axis relative to the lower retention tab.

14. The fiber optic organizing system of any one or more clauses herein, the system including a plurality of pairs of retention tabs, wherein each pair of retention tabs comprises the upper retention tab offset along the longitudinal axis to a respective lower retention tab.

15. The fiber optic organizing system of any one or more clauses herein, wherein the plurality of pairs of retention tabs comprises a first pair wherein the upper retention tab and the lower retention tab extend further along the lateral axis relative to a second pair of the upper retention tab and the lower retention tab.

16. The fiber optic organizing system of any one or more clauses herein, wherein the second pair of the upper retention tab and the lower retention tab is positioned along the longitudinal axis between two or more of the first pair of the upper retention tab and the lower retention tab.

17. The fiber optic organizing system of any one or more clauses herein, wherein the plurality of walls comprises a first sidewall separated from a second sidewall along the lateral axis, wherein the plurality of pairs of retention tabs is extending from each of the first sidewall and the second sidewall, and wherein the first pair of retention tabs is positioned at the first sidewall opposite along the lateral axis of the first pair of retention tabs positioned at the second sidewall.

18. The fiber optic organizing system of any one or more clauses herein, wherein the plurality of pairs of retention tabs is extending from each of the first sidewall and the second sidewall, and wherein the second pair of retention tabs is positioned at the first sidewall opposite along the lateral axis of the second pair of retention tabs positioned at the second sidewall.

19. The fiber optic organizing system of any one or more clauses herein, wherein the upper retention tab is non-overlapping along the transverse axis relative to the lower retention tab.

20. The fiber optic organizing system of any one or more clauses herein, wherein the base panel forms an opening corresponding to each of the upper retention tab and the lower retention tab.

21. The fiber optic organizing system of any one or more clauses herein, wherein the upper retention tab is extending from the first sidewall from an uppermost edge along the transverse direction.

22. The fiber optic closure of any one or more clauses herein, wherein the plurality of hinge assemblies is a linear array angled relative to the transverse axis.

23. A fiber optic closure including the fiber optic organizing system of any one or more clauses herein.

24. A fiber optic closure including the adapter module of any one or more clauses herein.

25. A fiber optic closure including the splice module of any one or more clauses herein.

26. A fiber optic closure including the fiber optic organizing system, the adapter module, and the splice module of any one or more clauses herein.

27. A fiber optic organizing system defining a mutually orthogonal coordinate system having a longitudinal axis, a lateral axis, and a transverse axis, the fiber optic organizing system including a main body, the main body including a plurality of walls separated along the longitudinal axis between a front and a rear and along the lateral axis, the main body including a base panel connecting the plurality of walls; an upper retention tab extending along the lateral axis or the longitudinal axis from one or more of the plurality of walls; and a lower retention tab extending from the plurality of walls and positioned proximate along the transverse axis to the base panel relative to the upper retention tab.

28. The fiber optic organizing in accordance with any one or more clauses herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A fiber optic closure, the closure comprising:

a base insertable at least partially into an interior of the closure;

a basket extending along a longitudinal axis between a first end and a second end, wherein the first end forms an open end such that one or more cables extends into the interior of the closure along the longitudinal axis, and the second end forms a closed end;

a bracket assembly extending along a transverse axis from the basket, the bracket assembly comprising a plurality of hinge assemblies along the transverse axis;

a fiber optic organizing system rotatably and removably connectable to the bracket assembly between the hinge assemblies, the organizing system extending along the longitudinal axis between the first end and the second end and extending along a lateral axis between a first sidewall and a second sidewall, wherein a plurality of pairs of retention tabs comprises an upper retention tab and a lower retention tab, the upper retention tab extending along the lateral axis from one or more of the first sidewall or the second sidewall, and the lower retention tab extending from the first sidewall or the second sidewall proximate along the transverse axis to the base panel relative to the upper retention tab, wherein each pair of retention tabs comprises the upper retention tab offset along the longitudinal axis to a respective lower retention tab; and a connector shaft extending from the first end along the longitudinal axis, the connector shaft connecting the organizing system and the base together.

2. The fiber optic closure of claim 1, wherein the plurality of hinge assemblies is a linear array angled relative to the transverse axis.

3. The fiber optic closure of claim 2, the fiber optic closure comprising:

an adapter module comprising an adapter wall extending along the transverse axis, wherein a slot is extending along the transverse axis from an upper peripheral edge of the adapter wall, and wherein an adapter insert is extending along a base panel and disposable within slots at adapter walls.

4. The fiber optic closure of claim 1, wherein the upper retention tab is offset along the longitudinal axis relative to the lower retention tab.

5. The fiber optic closure of claim 1, wherein the plurality of pairs of retention tabs comprises a first pair wherein the upper retention tab and the lower retention tab extend further along the lateral axis relative to a second pair of the upper retention tab and the lower retention tab.

6. The fiber optic closure of claim 5, wherein the second pair of the upper retention tab and the lower retention tab is positioned along the longitudinal axis between two or more of the first pair of the upper retention tab and the lower retention tab.

7. The fiber optic closure of claim 5, wherein the plurality of walls comprises a first sidewall separated from a second sidewall along the lateral axis, wherein the plurality of pairs of retention tabs is extending from each of the first sidewall and the second sidewall, and wherein the first pair of retention tabs is positioned at the first sidewall opposite along the lateral axis of the first pair of retention tabs positioned at the second sidewall.

8. The fiber optic closure of claim 5, wherein the plurality of pairs of retention tabs is extending from each of the first sidewall and the second sidewall, and wherein the second pair of retention tabs is positioned at the first sidewall opposite along the lateral axis of the second pair of retention tabs positioned at the second sidewall.

9. The fiber optic closure of claim 1, wherein the upper retention tab is non-overlapping along the transverse axis relative to the lower retention tab.

10. The fiber optic closure of claim 1, wherein the base panel forms an opening corresponding to each of the upper retention tab and the lower retention tab.

11. The fiber optic closure of claim 1, wherein the upper retention tab is extending from the first sidewall from an uppermost edge along the transverse direction.

12. The fiber optic closure of claim 1, wherein a plurality of mount openings is formed at the base panel.

13. The fiber optic closure of claim 12, the system comprising:

a splice module forming one or more module walls extending along the transverse axis and the lateral axis, wherein the plurality of mount openings is configured to receive the splice module and affix to the base panel.

14. The fiber optic closure of claim 13, wherein the splice module comprises one or more partitions extending from the module wall along a direction between the lateral axis and the longitudinal axis.

15. The fiber optic closure of claim 14, wherein the partitions are deformable to allow a splice sleeve to affix to the splice module between pairs of module walls.

16. The fiber optic closure of claim 13, wherein the splice module retainer comprises a leg corresponding to a respective mount opening formed at the base panel.

17. A fiber optic closure, the fiber optic closure comprising:

a base insertable at least partially into an interior of the closure;

a basket extending along a longitudinal axis between a first end and a second end, wherein the first end forms an open end such that one or more cables extends into the interior of the closure along the longitudinal axis, and the second end forms a closed end;

a bracket assembly extending along a transverse axis from the basket, the bracket assembly comprising a plurality of hinge assemblies along the transverse axis;

an organizing system rotatably and removably connectable to the bracket assembly between the hinge assemblies, the organizing system comprising a main body, the main body including a plurality of walls separated along the longitudinal axis between a front and a rear and along the lateral axis, the main body comprising a base panel connecting the plurality of walls, wherein a plurality of pairs of retention tabs comprises an upper retention tab and a lower retention tab, the upper retention tab extending along the lateral axis from one or more of the plurality of walls, and the lower retention tab extending from one or more of the plurality of walls proximate along the transverse axis to the base panel relative to the upper retention tab, wherein each pair of retention tabs comprises the upper retention tab offset along the longitudinal axis to a respective lower retention tab, the organizing system comprising an adapter module comprising a leg corresponding to a respective mount opening formed at the base panel, wherein the adapter module is receivable by the mount opening at the base panel, and wherein the adapter module comprises a laterally extending adapter wall, wherein the adapter wall forms a slot extending along the transverse axis configured to receive an adapter insert; and a connector shaft extending from the first end along the longitudinal axis, the connector shaft connecting the organizing system and the base together.

18. The fiber optic closure of claim 17, the organizing system comprising a splice module forming one or more module walls extending along the transverse axis and the lateral axis, wherein the plurality of mount openings is configured to receive the splice module and affix to the base panel, the splice module comprising one or more partitions extending from the module wall along a direction between the lateral axis and the longitudinal axis.

* * * * *